(12) United States Patent
Shiono

(10) Patent No.: US 8,031,577 B2
(45) Date of Patent: Oct. 4, 2011

(54) OPTICAL INFORMATION RECORDING/REPRODUCING DEVICE

(75) Inventor: Teruhiro Shiono, Osaka (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 12/295,398

(22) PCT Filed: Apr. 13, 2007

(86) PCT No.: PCT/JP2007/058175
§ 371 (c)(1),
(2), (4) Date: Sep. 30, 2008

(87) PCT Pub. No.: WO2007/123065
PCT Pub. Date: Nov. 1, 2007

(65) Prior Publication Data
US 2009/0290478 A1    Nov. 26, 2009

(30) Foreign Application Priority Data

Apr. 18, 2006    (JP) .................................. 2006-114168

(51) Int. Cl.
*G11B 7/00*    (2006.01)
(52) U.S. Cl. ............................. 369/112.28; 369/112.24
(58) Field of Classification Search .................. None
See application file for complete search history.

(56) References Cited

U.S. PATENT DOCUMENTS

| 6,434,105 | B1* | 8/2002 | Kobayashi | ............... 369/112.28 |
| 2002/0060959 | A1 | 5/2002 | Shiono et al. | |
| 2002/0071377 | A1 | 6/2002 | Ogata | |
| 2004/0257962 | A1* | 12/2004 | Walker et al. | ............ 369/112.23 |
| 2006/0087711 | A1* | 4/2006 | Tukker et al. | ................. 359/198 |
| 2007/0153344 | A1* | 7/2007 | Lin et al. | ......................... 359/25 |

FOREIGN PATENT DOCUMENTS

| CN | 1348178 | 5/2002 |
| CN | 1682294 | 10/2005 |
| JP | 7-110962 | 4/1995 |
| JP | 2002-222526 | 8/2002 |

OTHER PUBLICATIONS

Chinese Office Action issued Apr. 19, 2010 in corresponding Chinese Application No. 200780013719.7.
International Search Report issued Jul. 17, 2007 in the International (PCT) Application No. PCT/JP2007/058175.
Kawata, Yoshimasa, "Three-Dimensional Optical Memory Using a Femtosecond Laser", *Optronics*, 11: 138-142 (2001). (Partial Translation).

* cited by examiner

*Primary Examiner* — Joseph Haley
(74) *Attorney, Agent, or Firm* — Wenderoth, Lind & Ponack, L.L.P.

(57) ABSTRACT

An optical information recording/reproducing device is provided with a first light source $20a$ for emitting recording light $22a$, a second light source $20b$ for emitting reproducing light $22b$, an objective lens 6 for focusing the emitted lights from the both light sources $20a$, $20b$ on an information recording medium including a recording region 3 capable of three-dimensional recording and photodetectors $19a$, $19b$ for detecting reflected lights $7a'$, $7b'$ from the information recording medium, and records information on recording layers $1a$ to $1e$ utilizing a nonlinear absorption phenomenon. At the objective lens 6, an average rim intensity of the recording light $7a$ is lower than that of the reproducing light $7b$.

25 Claims, 14 Drawing Sheets

OPTICAL INFORMATION RECORDING/REPRODUCING DEVICE

TECHNICAL FIELD

The present invention relates to an optical information recording/reproducing device for recording information on an information recording medium capable of three-dimensional recording utilizing a nonlinear absorption phenomenon and particularly to an optical information recording/reproducing device with high light utilization efficiency of recording light and good optical characteristics.

BACKGROUND ART

Optical memories using optical discs such as compact discs (CD) and DVDs, optical cards and the like as media are utilized as optical information recording/reproducing device. In order to realize larger capacity for recording information, an optical information recording/reproducing device for recording/reproducing information on/from a multi-layer information recording medium including a plurality of recording layers so as to be capable of three-dimensional recording as shown in FIG. 14 is disclosed in non-patent literature 1.

An optical disc 121 is such an information recording medium that recording layers 101a to 101d using a urethane-urea copolymer material as a photon-mode recording material and intermediate layers 102a to 102c using PVA (polyvinyl alcohol) films and PMMA (polymethyl methacrylate) films are alternately formed on a transparent substrate 104 of glass.

Light 122a emitted as parallel light from a recording light source 120a including a Ti sapphire laser and having a wavelength of 790 nm and a large peak power passes through a beam splitter 118a and has the beam diameter thereof expanded by a beam expander 123. Expanded light 108 passes through a beam splitter 118b and is focused (convergent light 107) on the desired recording layer 101c of the multi-layer optical disc 121 by an objective lens 106 to be recorded as a recording pit 105 utilizing a nonlinear phenomenon such as a two-photon absorption process.

Light 122b emitted as parallel light from a reproducing light source 120b including a He—Ne laser and having a wavelength of 0.6328 μm and a small peak power is focused on the recording pit 105 of the desired recording layer 110c by the objective lens 106 in the same manner as above (convergent light 107). The reflected light is bent in an X-axis direction by the beam splitter 118b and focused by a detection lens 111, passes through a pinhole 114 arranged at a focal position of the detection lens 111 and is detected by a photodetector 119, whereby a signal can be reproduced.

However, the Ti sapphire laser is used for the recording light source and the He—Ne laser is used for the reproducing light source in non-patent literature 1, which leads to the enlargement of the device and higher cost. Thus, it is practically desirable to use small-size semiconductor lasers as both recording and reproducing light sources, and the use of the semiconductor lasers enables the miniaturization and cost reduction of the optical information recording/reproducing device. However, if the semiconductor laser light sources are used on conditions similar to those for normal optical disc drives such as DVD drives, light quantity necessary for nonlinear recording cannot be obtained since there is a limit in peak power as compared to the Ti sapphire laser.

In nonlinear recording such as two-photon absorption recording, multiphoton absorption recording and plasma absorption recording, the sensitivity of an information recording medium nonlinearly increases as the peak power of recording light focused on the information recording medium increases since a nonlinear characteristic is utilized. For example, in the two-photon absorption recording, recording sensitivity has a square characteristic (n-th power characteristic in n-photon recording), wherefore recording sensitivity increases to the fourfold of the square if the peak power of recording light doubles. Accordingly, in order to use a semiconductor laser having a limit in the peak power of emitted light as compared to the Ti sapphire laser, it is desirable to introduce a focused spot of the recording light focused on a recording layer to an objective lens as efficiently as possible without deteriorating optical characteristics of the focused spot (without making the effective focused spot size of the recording light too much larger than the focused spot size of reproducing light). However, in order to obtain a light quantity necessary for nonlinear recording, the effective focused spot size of the recording light has to be set larger than the focused spot size of the reproducing light if semiconductor laser light sources are used on conditions similar to those for a normal optical disc drive such as a DVD drive, wherefore the spot diameter of the reproducing light and that of the recording light cannot be balanced.

[Non-Patent Literature 1]

"Three-Dimensional Optical Memory Using a Femtosecond Laser" by Yoshimasa Kawada, Optronics No. 11, pp. 138-142 (2001).

DISCLOSURE OF THE INVENTION

An object of the present invention is to provide an optical information recording/reproducing device capable of improving the light utilization efficiency of recording light, satisfactorily balancing spot diameters of recording and reproducing lights and obtaining good optical characteristics.

One aspect of the present invention is directed to an optical information recording/reproducing device, comprising a light source unit for emitting recording light and reproducing light; an objective lens for focusing the recording and reproducing lights on an information recording medium; and a photodetector for detecting the light reflected from the information recording medium, wherein the information recording medium includes a recording region capable of three-dimensionally recording information by the recording light utilizing a nonlinear absorption phenomenon, and an average rim intensity of the recording light at the objective lens is lower than that of the reproducing light.

In this optical information recording/reproducing device, since the average rim intensity of the recording light at the objective lens is lower than that of the reproducing light, an effective focused spot diameter of the recording light narrowed down by the objective lens becomes a good focused spot diameter by no means inferior to a focused spot diameter of the reproducing light by utilizing the nonlinear absorption phenomenon at the time of recording even if its rim intensity is low while the recording light from the light source unit is introduced with high efficiency. Thus, the light utilization efficiency of the recording light can be improved and the spot diameters of the reproducing light and the recording light can be well-balanced, with the result that an optical information recording/reproducing device capable of obtaining good optical characteristics such as an increased modulation depth at the time of reproduction can be realized.

BEST MODES FOR EMBODYING THE INVENTION

Hereinafter, embodiments of the present invention are described with reference to the accompanying drawings.

First Embodiment

First of all, an optical information recording/reproducing device according to a first embodiment of the present invention is described in detail with reference to FIGS. 1, 2A and 2B.

Figure 1:
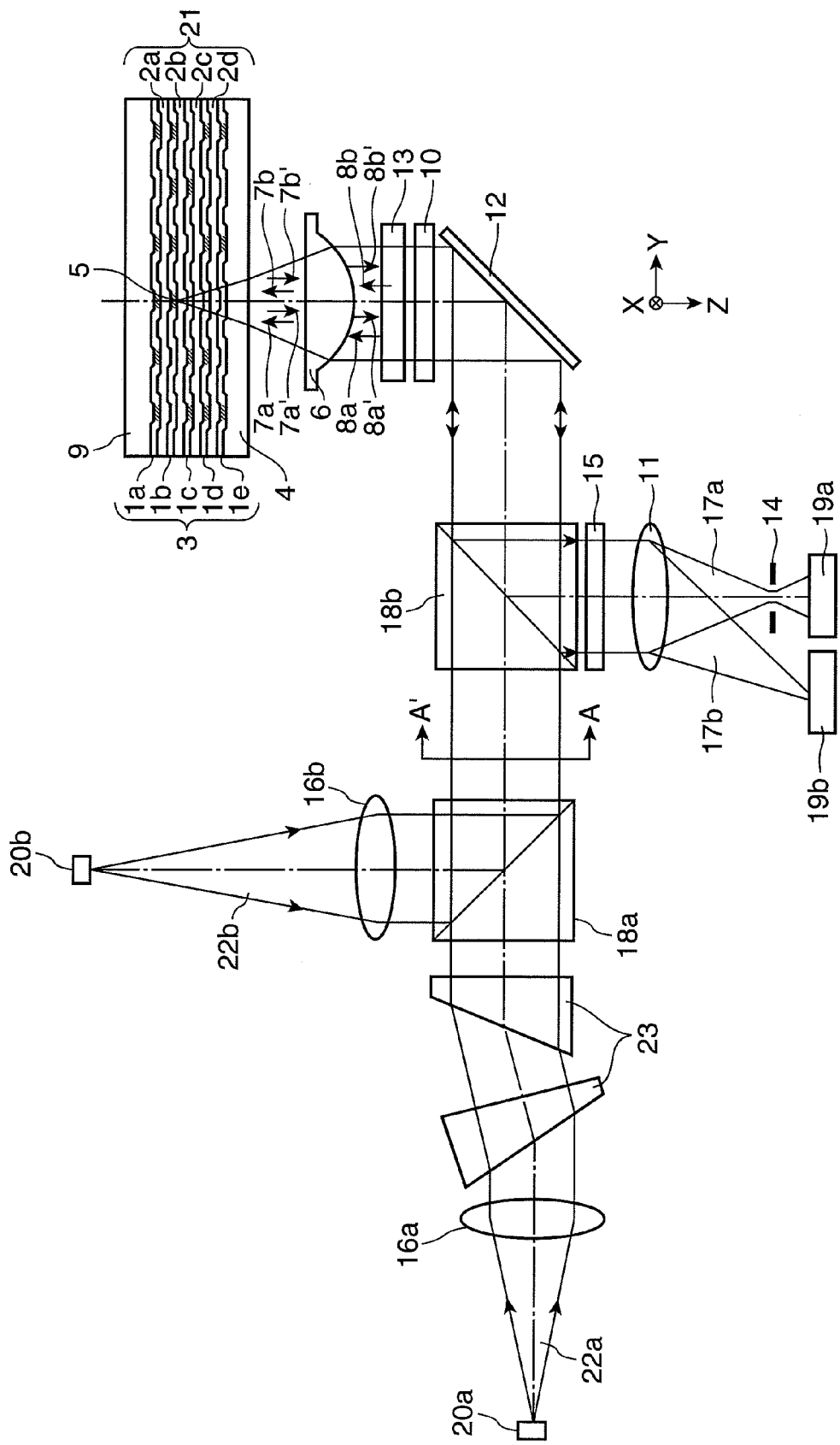
FIG. 1 is a diagram showing the construction of an optical information recording/reproducing device according to a first embodiment of the invention and states of recording/reproducing a signal on/from an information recording medium.

FIG. 1 is a diagram showing the construction of the optical information recording/reproducing device according to the first embodiment of the present invention and states of recording/reproducing a signal on/from an information recording medium.

As shown in FIG. 1, the optical information recording/reproducing device of this embodiment is provided with two types of semiconductor laser light sources, i.e. a first light source 20a as a recording light source and a second light source 20b as a reproducing light source. A first collimator lens 16a, a pair of beam shaping prisms 23, beam splitters 18a, 18b, a reflecting mirror 12, a wave plate 10, a spherical aberration correction element 13 and an objective lens 6 are arranged in an optical path from the first light source 20a to an information recording medium 21. The beam splitter 18a is used as a combining element for combining two lights on the same optical path and the beam splitter 18b is used as a splitting element for splitting light.

A second collimator lens 16b is arranged in an optical path between the second light source 20b and the beam splitter 18a, and recording light 22a and reproducing light 22b are combined by the beam splitter 18a to be introduced to a common optical path. Although the beam shaping prism 23 is described as a beam shaping element, a beam shaper or the like for changing a magnifying power only in one axial direction can also be used.

A focus/tracking error signal detection element 15, a detection lens 11 and a pinhole 14 for reducing the interlayer crosstalk of the information recording medium 21 are arranged in an optical path from the beam splitter 18b to photodetectors 19a, 19b as a return path.

Normally, emitted light of a laser is a Gaussian beam. In a semiconductor laser, the spread of the Gaussian beam differs in a direction parallel to a junction surface of the semiconductor laser (hereinafter, "h direction") and a direction perpendicular thereto (hereinafter, "v direction"). If $\theta h$, $\theta v$ denote full widths at half maximum of a radiation angle in the h-direction and v-direction, a far-field light intensity distribution normally has an elliptical shape with a major axis in the v-direction at $\theta h/\theta v=\frac{1}{2}$ to $\frac{1}{3}$ although it differs depending on an emission wavelength and a laser structure.

A wavelength $\lambda 1$ of the first light source 20a satisfies $0.73$ $\mu m \leq \lambda 1 \leq 0.83$ $\mu m$. For example, $\lambda 1=0.785$ $\mu m$ and a radiation angle is such that $\theta h=8.8°$ and $\theta v=17°$. The first light source 20a is arranged such that a Z-direction in a coordinate system shown in FIG. 1 coincides with the h-direction of the first light source 20a. The first light source 20a is driven by changing the pulse width of a drive pulse, e.g. between 1 nanosecond and 100 nanoseconds in conformity with the shape (mark or the like) of a recording pit 5 to be recorded on a track of one (hereinafter, recording layer 1b is described an example of such a recording layer) of recording layers 1a to 1e, for example, at a relatively large peak power of several 100 mW to several W, and functions as a recording light source. By using a photon-mode recording material as described later, the recording pit 5 is not influenced by heat, wherefore a recording strategy and the like is simplified and the above drive pulse can be easily controlled.

A wavelength $\lambda 2$ of the second light source 20b satisfies $0.6$ $\mu m \leq \lambda 2 \leq 0.7$ $\mu m$. For example, $\lambda 2=0.658$ $\mu m$ and a radiation angle is such that $\theta h=10°$ and $\theta v=17°$. The second light source 20b is mainly CW (continuous wave) driven and functions as a reproducing light source.

Although the wave plate 10 is arranged in the common optical path for the recording and reproducing lights from the beam splitter 18b to the objective lens 6 as shown in FIG. 1, it is designed to be substantially a quarter wave plate or approximate thereto for the recording light and to be substantially a half wave plate, a wave plate or approximate thereto for the reproducing light utilizing a wavelength difference. By such designing, there are effects of increasing light utilization efficiency on the forward and return optical paths since a polarizing system is used for the recording light, and reducing the influence of birefringence, which could occur in the information recording medium 21, for the reproducing light.

The beam splitter 18a also transmits the recording light 22a and reflects the reproducing light 22b utilizing the wavelength difference. Further, the beam splitter 18b is designed to function as a polarizing beam splitter for the recording light 22a and to function as a half mirror, which hardly depends on a polarization direction, for the reproducing light 22b utilizing the wavelength difference.

The information recording medium 21 has a thickness of, e.g. 1.1 mm and includes a substrate 9 having a diameter of 12 cm and a recording region 3 formed on the substrate 9, wherein the recording region 3 is capable of three-dimensionally recording information and includes, for example, a plurality of recording layers 1a to 1e and a plurality of intermediate layers 2a to 2d alternately formed. Since three-dimensional recording is possible also for such a bulk recording medium that the recording region 3 is entirely made up of recording layers, the present invention is similarly applicable. Although a case of five recording layers 1a to 1e and four intermediate layers 2a to 2d is shown in FIG. 1, it is actually also possible to use several tens to about hundred recording layers and the number of the layers is not particularly limited to those in the shown example.

Here, the intermediate layers 2a to 2d hardly have any absorption loss at the recording light wavelength $\lambda 1$ and the reproducing light wavelength $\lambda 2$, and the recording layers 1a to 1e can also reduce absorption losses, so that three-dimensional recording and reproduction can be efficiently performed to a plurality of recording layers 1a to 1e. In other words, by utilizing a nonlinear absorption phenomenon, the recording layers 1a to 1e with a large transmittance can be used and large-capacity recording with a large number of layers can be performed.

However, for example, for the recording by two-photon absorption, the recording layers 1a to 1e are made of a recording material which is substantially transparent at the recording light wavelength $\lambda 1$, but exhibits absorption at half this wavelength. In other words, in the recording by n-photon absorption, the recording layers 1a to 1e are made of a recording material, which is substantially transparent at a recording light wavelength, but exhibits absorption at 1/n of this wavelength. Here, n is an arbitrary integer equal to or greater than 2.

At a light incident side of the recording region 3, a protection layer 4 having a thickness of, e.g. 0.1 mm is further provided. By providing the protection layer 4, reproduction is possible even if there is some dust, dirt or scratch on or in the information recording medium 21.

Each recording layer 1a to 1e is formed with a track groove for tracking servo. For example, a track pitch Tp is 0.59 $\mu m$, a groove depth is 0.49 $\mu m$ and a tracking error signal is obtained by detecting $\pm 1^{st}$-order diffracted lights from this groove by means of the photodetector 19b, whereby recording/reproduction can be accurately performed along the track.

Since a material susceptible to a nonlinear effect has high recording sensitivity, it is desirable to form the recording layers 1a to 1e of such a recording material. In the case of using a photon-mode recording material, the recording layers 1a to 1e can be formed as single layer since high-speed recording is possible and there is no influence of heat.

In diarylethene as one of photochromic materials or its derivative, rewritable recording capable of recording and erasure can be realized. Further, if the recording layers 1a to 1e including a photochromic material further include such a fluorescent material for emitting light of a wavelength to photosensitize the photochromic material with high efficiency, for example, in a two-photon absorption process of recording light, the sensitivity of the recording material can be improved. Specifically, this is for the following reason. Photochromic materials generally have no high recording sensitivity in the two-photon absorption process, but some of fluorescent materials have high recording sensitivities in the two-photon absorption process. By this two-photon fluorescence, the photochromic material can be photosensitized in the one-photon absorption process. It should be noted that photochromic materials generally have good one-photon absorption sensitivities.

Further, materials capable of recording in a photon mode such as liquid crystalline side-chain polymers and photopolymers can also be used for the recording layers $1a$ to $1e$. Liquid crystalline side-chain polymers have a characteristic of increasing a refractive index change of the recording pit $5$ after the recording (for example, $\Delta n=0.2$) and can record a polarization direction, wherefore recording capacity can be substantially doubled. Photopolymers are suitable for write-once recording and stable after the recording.

In addition, organic pigments, resin films mixed with ultrafine particles such as ZnO, $TeO_2$ films and the like are also suitable as the material for the recording layers $1a$ to $1e$ for nonlinear recording, and the absorption loss of light can be reduced by utilizing a refractive index change. The refractive index change amount can be controlled by a way of emitting the recording light. If pulsed light having a relatively high peak power of several W to several 10 kW is used, it is also possible to record a perforated pit called a "void". In the case of a void, refractive index is 1. Thus, if the refractive index of the recording film is, for example, 1.7, the refractive index change amount increases to $\Delta n=-0.7$, wherefore there is an effect of being able to reproduce a signal with good contrast.

In the optical information recording/reproducing device of this embodiment, as shown in FIG. 1, pulsed laser light $22a$ which is a linearly polarized light emitted from the first light source $20a$ for recording in a Y-axis direction and having a relatively large peak power is converted into parallel light by the first collimator lens $16a$ and has the beam diameter thereof expanded only in the Z-direction by the pair of beam shaping prisms $23$ such that the beam diameters thereof in the X- and Z-directions are substantially equal during the recording. When the beam diameter is expanded (e.g. in an A-A' plane or the like), a radiation angle of the light source $20a$ is equivalently assumed such that $\theta h=\theta v=17°$. Thereafter, the laser light having the beam diameter expanded passes through the beam splitters $18a$, $18b$ and has the optical path thereof bent in a $-Z$-axis direction by the reflecting mirror $12$. That the beam diameters are substantially equal is assumed to be such that a ratio of the beam diameter in the X-direction to that in the Z-direction lies in a range of 0.7 to 1.3 (the beam diameters are completely equal if this ratio is 1).

Laser light $8a$ bent in the $-Z$-axis direction is converted into a substantially circularly polarized light by the wave plate $10$, passes through the spherical aberration correction element $13$ and is focused on the desired recording layer $1b$ of the recording region $3$ including a plurality of recording layers $1a$ to $1e$ through the protection layer $4$ of the information recording medium $21$ by the objective lens $6$ having, for example, an numerical aperture NA=0.85, a focal length of 2 mm and an effective diameter of 3.4 mm to become convergent light $7a$. Reflected light $7a'$ of the convergent light $7a$ becomes reflected light $8a'$ upon passing through the objective lens $6$, and optical constants, preferably refractive indices, of the recording layers $1a$ to $1e$ are changed to record the recording pit $5$ utilizing a nonlinear phenomenon such as two-photon absorption or multiphoton absorption process while by the use of the reflected light $8a'$ a focus servo and a tracking servo are performed.

At this time, since the spherical aberration correction element $13$ is provided in the optical path from the first light source $20a$ to the objective lens $6$ and the thickness of the recording region $3$, at which the convergent light $7a$ passes, differs depending on a recording depth, a satisfactory recording pit $5$ can be formed if it is recorded while controlling a spherical aberration amount according to the recording depth of the recording pit $5$ being recorded in the recording region $3$. The spherical aberration correction element $13$ is, for example, a liquid crystal element whose refractive index distribution is variable, a beam expander in which a concave lens and a convex lens are so combined as to make an interval between the two lenses in an optical axis direction variable by an actuator, a variable collimator lens whose position can be controlled in the optical axis direction, or the like.

During the reproduction, laser light $22b$ which is a linearly polarized light emitted from the second light source $20b$ for reproducing is converted into substantially parallel light by the second collimator lens $16b$ and bent in the Y-axis direction by the beam splitter $18a$, similarly passes through the beam splitter $18b$ to have the optical path bent in the $-Z$-axis direction by the reflecting mirror $12$. Laser light $8b$ bent in the $-Z$ axis direction passes through the wave plate $10$ and the spherical aberration correction element $13$ and is focused as the linearly polarized light on the recording pit $5$ of the recording layer $1b$ of the recording region $3$ of the information recording medium $21$ by the objective lens $6$ to become convergent light $7b$.

Laser light $7b'$ reflected by the recording pit $5$ returns in an opposite direction and passes through the objective lens $6$ to become parallel light $8b'$. The parallel light $8b'$ successively passes through the spherical aberration correction element $13$, the wave plate $10$ and the reflecting mirror $12$, has the optical axis thereof bent in the Z-axis direction by the beam splitter $18b$, is split by the diffractive focus/tracking error signal detection element $15$ into a plurality of lights (into two lights in FIG. 1), which are converged by the detection lens $11$ to become convergent lights $17a$, $17b$.

The convergent light $17a$ to become reproducing light passes through the pinhole $14$ to have the recorded signal detected by the photodetector $19a$. The split convergent light $17b$ is detected by another photodetector $19b$ to become focus/tracking error signals without passing through the pinhole $14$. From the convergent light $17b$, focus and tracking error signals can be detected by a conventional method such as an astigmatism method, an SSD method or a three-beam tracking method by not letting the convergent light $17b$ pass through the pinhole $14$. In other words, the recording pit $5$ can be recorded by performing a focus servo and a tracking servo utilizing the reflected lights $7a'$, $7b'$ and can be reproduced from a refractive index difference based on a change in the optical constant of the recording pit $5$ during the recording and during the reproduction.

Here, the focal length of the detection lens $11$ is, for example, 33 mm and an airy disk diameter thereof at a side toward the photodetector $19a$ is, for example, 9.6 μm. The pinhole $14$ is located substantially at the focal position of the detecting convergent light $17a$. By providing the pinhole $14$, crosstalk (interlayer crosstalk) lights, which are unnecessary reflected lights from other recording pits in the recording layers $1a$, $1c$ and $1d$ above or below the desired recording layer $1b$ in the optical axis direction irradiated by the convergent light $7b$ from the objective lens $6$, distribute also outside the pinhole $14$ and do not enter the pinhole $14$, wherefore there is an effect of reducing the interlayer crosstalk. Even if the pinhole $14$ is omitted and, instead, a light receiver of the photodetector detects the detecting convergent light $17a$ using a microphotodetector having the size of the pinhole diameter, a similar effect can be obtained.

In an experiment result of the present inventors, the quality of a reproduced signal can be improved up to a problem-free level (interlayer crosstalk amount≦30 dB), for example, at a layer interval Δd=5 to 8 μm of the recording layers 1a to 1e by setting the size of the pinhole 14 equal to or smaller than the threefold of the airy disk diameter of the detecting convergent light 17a. If the size of the pinhole 14 is reduced, the intervals (substantially the thicknesses of the intermediate layers 2a to 2d) between the recording layers 1a to 1b can be further reduced. If the size of the pinhole 14 is excessively reduced, the quantity of light entering the pinhole 14, or the convergent light 17a may deviate from the center of the pinhole 14 by the distortion of the optical system due to ambient temperature. Such factors also need to be considered. Further, if the light quantity decreases due to restriction on the material or the like, signal intensity can be increased by using an APD (avalanche photodiode).

Next, a focusing characteristic in nonlinear recording is described. In the case of normal one-photon absorption recording, it is known that a focused spot diameter on a focus plane where light is focused by an objective lens is determined from a numerical aperture NA of the objective lens and a wavelength λ, a spot is best narrowed down in the case of plane wave incidence equivalent to a rim intensity of 1 and the full width at half maximum of the spot diameter at that time is 1.03λ/(2NA). It should be noted that the rim intensity is normalized light intensity at a rim portion of the effective diameter of the objective lens with the maximum intensity in a central part set at 1. Accordingly, the rim intensity has a value between 0 (inclusive) and 1 (inclusive).

For example, when NA=0.85, the full width at half maximum of the focused spot diameter is 0.473 μm at λ=0.785 μm and is 0.399 μm at λ=0.658 μm. If the numerical aperture of the objective lens is constant, the shorter the wavelength, the better the spot is narrowed down. Accordingly, if the wavelength λ1 of the recording light is longer than the wavelength λ2 of the reproducing light, the focused spot diameter of the recording light is larger than that of the reproducing light, whereby a recording characteristic is deteriorated as compared to a reproducing characteristic. Therefore, a measure needs to be taken, for example, by increasing the numerical aperture of the objective lens relative to the recording light.

On the other hand, in the case of recording utilizing a nonlinear phenomenon, the effective focused spot of the recording light can be made smaller as compared to normal one-photon absorption recording. In the case of plane wave incidence (when the rim intensity is 1), it is proven that an effective spot diameter at which n-photon absorption occurs can be narrowed down approximately to the $(n^{-1/2})$-fold, for example, in n-photon absorption recording. In other words, the full width at half maximum of the focused spot diameter when the rim intensity is 1 is expressed by $1.03\lambda \cdot n^{-1/2}/(2NA)$. For example, in two-photon absorption recording, $n^{-1/2}$ is $2^{-1/2}=0.71$ since n=2. Thus, the spot is effectively narrowed down approximately to the 0.71-fold as compared to one-photon absorption recording.

As a result of investigation, the present inventors found out that a ratio $n^{-1/2}$ of narrowing down the spot diameter as compared to one-photon absorption recording was substantially the same if the rim intensity was the same as in the case of one-photon absorption recording even if n-photon absorption recording was performed by the incidence of a Gaussian beam such as a semiconductor laser light, i.e. even if the rim intensity was smaller than 1 (e.g. the rim intensity was equal to or above 0 and below 1). Specifically, it was found out that, in the case of performing n-photon absorption recording (n is an arbitrary integer equal to or greater than 2), the effective focused spot diameter of recording light at which n-photon absorption recording was performed could be made smaller than the focused spot diameter of reproducing light by a nonlinear effect regardless of the rim intensity in the case where $\lambda 2 > \lambda 1 \cdot n^{-1/2}$ was satisfied even if the wavelength λ2 of the reproducing light was substantially equal to or shorter than the wavelength λ1 of the recording light. That the wavelengths are substantially equal means that a wavelength difference is within 50 nm. If, for example, two-photon absorption recording is performed at a wavelength satisfying 0.73 μm≦λ1≦0.83 μm and reproduction is performed at a wavelength satisfying 0.6 μm≦λ2≦0.7 μm, a relational expression of $\lambda 2 > \lambda 1 \cdot n^{-1/2}$ holds.

In plasma absorption recording, expression by a mathematical equation is difficult since various phenomena such as multiphoton ionization intricately act. However, there is no doubt that the spot diameter can be narrowed down as compared to one-photon absorption recording. Thus, the effective focused spot diameter of the recording light can be made smaller than the focused spot diameter of the reproducing light.

Next, a relationship of the rim intensity at the objective lens, the coupling efficiencies from the light sources to the collimator lenses and the focused spot diameters is described with reference to FIG. 2A and FIG. 2B, taking the case of two-photon absorption recording as an example.

Figure 2A:
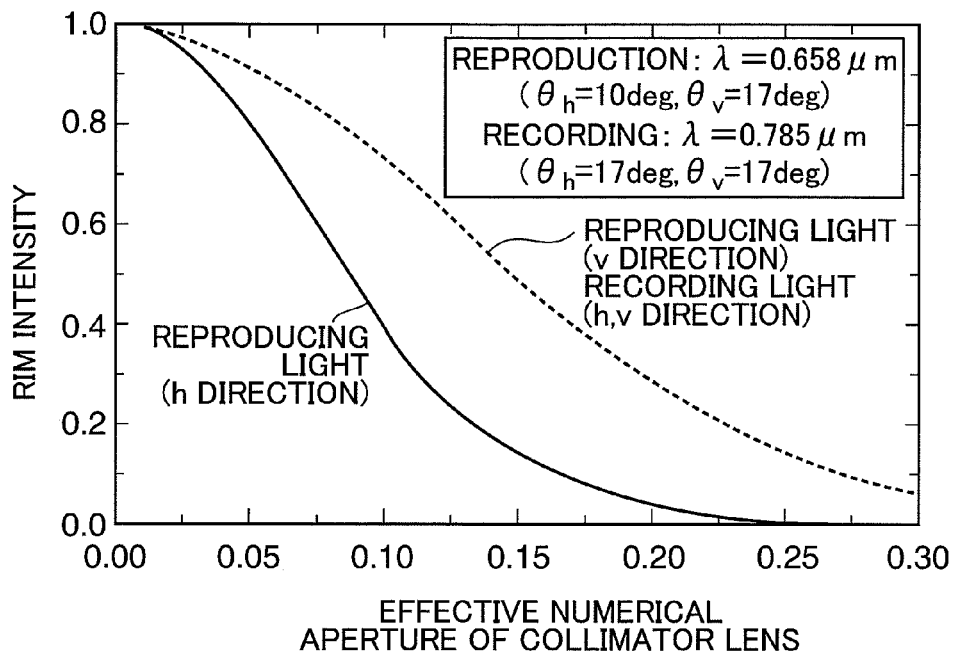
FIG. 2A is a graph showing a relationship between effective numerical apertures of collimator lenses and rim intensities at an objective lens in the optical information recording/reproducing device according to the first embodiment of the invention.
Figure 2B:
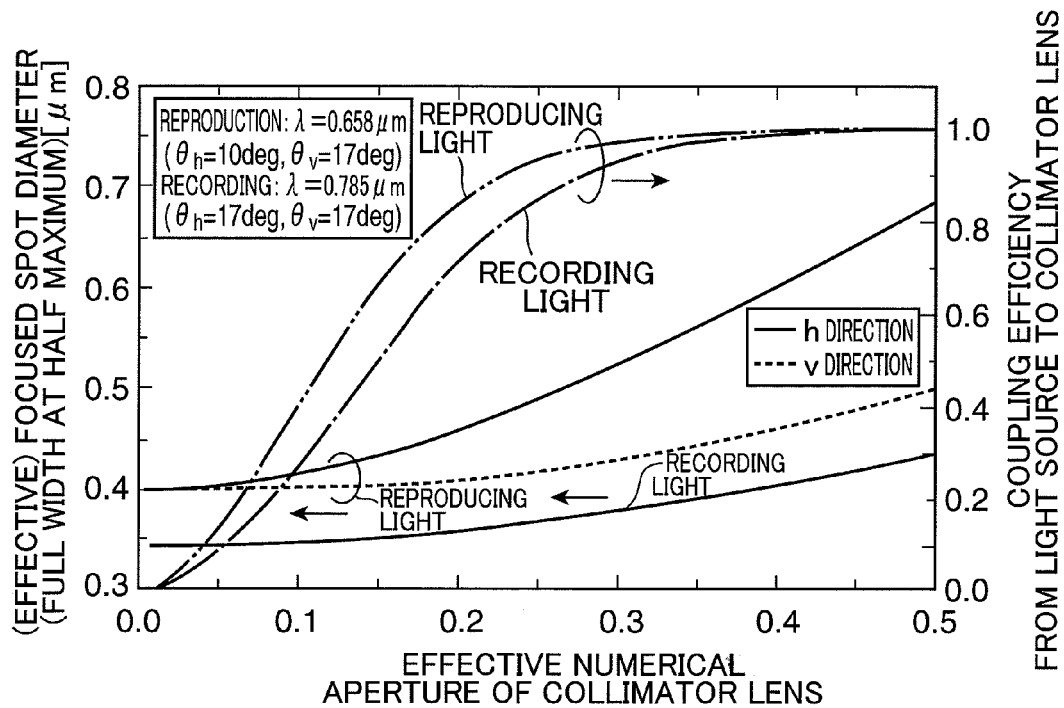
FIG. 2B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the first embodiment of the invention.

FIG. 2A is a graph showing a relationship between the effective numeral apertures of the collimator lenses and the rim intensities at the objective lens in the optical information recording/reproducing device according to the first embodiment of the present invention, and FIG. 2B is a graph showing a relationship between the effective numeral apertures of the collimator lenses and the focused spot diameters (full width at half maximum) on the recording layer (focus plane) of the information recording medium and a relationship between the numerical apertures and coupling efficiencies (when reflection on the collimator lens surfaces is ignored) from the light sources to the collimator lenses in the optical information recording/reproducing device according to the first embodiment of the present invention. FIG. 2A and FIG. 2B are graphs in the case of two-photon absorption recording as an example of nonlinear recording.

Here, the effective numerical aperture of the collimator lens is the numerical aperture of the collimator lens when the effective diameter of the collimator lens and that of the objective lens are assumed to be equal. Specifically, if f1, d1 denote the focal length and effective diameter of the collimator lens and f2, d2 (d1≧d2) the focal length and effective diameter of the objective lens, the numerical aperture of the collimator lens is normally d1/(2f1), but the effective numerical aperture thereof is defined to be d2/(2f1). It should be noted that the numerical aperture of the objective lens is defined to be d2/(2f2).

The word (effective) of the (effective) focused spot diameter (full width at half maximum) in FIG. 2B is used only for the recording light. In the case of two-photon absorption recording, the effective focused spot diameter (full width at half maximum) for the recording light is the full width at half maximum of the effective focused spot diameter at which two-photon absorption occurs and the full width at half maximum of a light intensity distribution, which is the square of the focused spot distribution in the case of normal one-photon absorption. In n-photon absorption recording, a light intensity is the n-th power of the focused spot distribution in the case of one-photon absorption. On the other hand, the focused spot diameter for the reproducing light, to which the word "effective" is not added, means a normal focused spot diameter.

In the optical information recording/reproducing device of this embodiment, the emitted lights 22a, 22b from the first and second light sources 20a, 20b are respectively collimated by the first and second collimator lenses 16a, 16, combined by the beam splitter 18a, incident as the parallel lights 8a, 8b on the objective lens 6 through the A-A' plane at the exit side of the beam splitter 18a and focused while being shaded at the effective diameter of the objective lens 6. Thus, the substantial effective diameters of the respective parallel lights in the A-A' plane can be assumed to be equal to the effective diameter (e.g. 3.4 mm) of the objective lens 6 (although the actual effective diameters of the collimator lenses are slightly larger than that of the objective lens, the effective diameters in the sense of introducing the collimated lights to the objective lens can be assumed as such), and the normalized light intensities of the respective parallel lights in the A-A plane' at the outer peripheries of the effective diameters are equal to the rim intensities at the objective lens 6. It is convenient if an effective numerical aperture using the same effective diameter as that of the objective lens is used as the numerical apertures of the collimator lenses in correspondence with the effective diameter.

In the optical information recording/reproducing device of this embodiment, the beam shaping prism 23 is used to shape the recording light 22a such that the beam diameters in the h-direction and v-direction are equal, wherefore the focused spot diameters and the rim intensities of the recording light in the h-direction and v-direction on the focus plane of the recording layer 1b are respectively equal as shown in FIG. 2A and FIG. 2B. On the other hand, for the reproducing light 22b, the focused spot diameter and the rim intensity differs depending on the direction. The rim intensity corresponding to the v-direction having a larger radiation angle is larger than that corresponding to the h-direction, and the focused spot diameter corresponding to the h-direction is larger than that corresponding to the v-direction.

In the optical information recording/reproducing device shown in FIG. 1, the emitted lights 22a, 22b from the first and second light sources 20a, 20b are focused on the recording layer after variously changing their propagation directions via the beam splitters 18a, 18b and the reflecting mirror 12. Thus, the h-direction and v-direction of the first light source 20a arranged such that the h-direction coincides with the Z-direction finally correspond to the Y-direction and X-direction in the focused spot. The h-direction and v-direction of the second light source 20b finally correspond to the Y-direction and X-direction in the focused spot if the second light source 20b is arranged such that the h-direction coincides with the Y-direction, and finally correspond to the X-direction and Y-direction in the focused spot if the second light source 20b is arranged such that the h-direction coincides with the X-direction.

The respective rim intensities of the recording light 8a and the reproducing light 8b at the objective lens 6 can be understood to decrease as the numerical apertures increase as shown by solid and dotted lines in FIG. 2A since the effective numerical aperture NA1 of the first collimator lens 16a depends on the effective numerical aperture NA2 of the second collimator lens 16b.

However, as shown in FIG. 2B, it can be understood that coupling efficiencies from the first light source 20a to the first collimator lens 16 and from the second light source 20b to the second collimator lens 16b increase as the effective numerical apertures of the respective collimator lenses 16a, 16b increase.

At the same effective numerical apertures of the collimator lenses, the coupling efficiency of the reproducing light is higher than that of the recording light. Further, the coupling efficiency of the reproducing light substantially reaches a maximum value of 100% when NA2 of the second collimator lens 16b is ≦0.3 as shown by chain double-dashed line, and the coupling efficiency of the recording light substantially reaches a maximum value of 100% when NA1 of the first collimator lens 16a is ≧0.4 as shown by dashed-dotted line. The focused spot diameter (full width at half maximum) focused on the recording layer of the information recording medium 21 by the objective lens 6 tends to increase as the effective numerical apertures of the collimator lenses increase. If the above is summarized, the coupling efficiencies from the light sources to the collimator lenses can be increased, but the focused spot diameters conversely deteriorate as the rim intensities decrease. If the coupling efficiencies from the light sources to the collimator lenses are high, the intensities of the lights focused on the recording layer of the information recording medium 21 increase, with the result that recording in a nonlinear phenomenon is preferably likely to occur.

The full width at half maximum of the focused spot diameter of the reproducing light 7b on the focus plane has a most preferable value when r=1, i.e. when the cross-section of the focused spot is right circular if r denotes a ratio of the focused spot diameter corresponding to the v-direction as a minimum value in a circumferential direction to that corresponding to the h-direction as a maximum value in the circumferential direction. The focused spot diameter is most narrowed down and the value thereof is 0.399 μm as described above when the plane wave having a rim intensity of 1 is incident as the reproducing light 7b on the objective lens 6.

For the reproducing light 7b, the maximum value of the effective numerical aperture NA2 of the second collimator lens 16b is 0.11 on a condition that a deterioration rate is 5% or less (focused spot diameter≦0.419 μm) as compared to a focused spot at a rim intensity of 1. At this time, the focused spot diameter is 0.417 μm (h-direction), 0.401 μm (v-direction), the coupling efficiency of the reproducing light is 46%, the rim intensity is 0.33 (h-direction), 0.69 (v-direction) with an average rim intensity of 0.51, and the elliptical ratio r of the focused spot diameter is 1.04.

The elliptical ratio r of the focused spot diameter of the recording light is 1.0, but there is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light.

Its maximum value is reached when NA1=0.39 (the substantial spot diameter of the recording light 7a at this time is 0.400 μm) and, at this time, the maximum coupling efficiency of the recording light is 99.1% substantially approximate to the maximum value and 2.2 times as high as that of the reproducing light (at a maximum 46%) and the rim intensity of the recording light at this time is 0.0089 and drastically smaller than an average rim intensity of 0.46 of the reproducing light.

Next, for the reproducing light 7b, the maximum value of the effective numerical aperture NA2 of the second collimator lens 16b is 0.07 on a condition that a more preferable deterioration rate is 2% or less (focused spot diameter≦0.407 μm) as compared to a focused spot at a rim intensity of 1. At this time, the focused spot diameter is 0.406 μm (h-direction), 0.399 μm (v-direction), the coupling efficiency of the reproducing light is 23%, the rim intensity is 0.64 (h-direction), 0.86 (v-direction) with an average rim intensity of 0.75, and the elliptical ratio r of the focused spot diameter is 1.02.

The elliptical ratio r of the focused spot diameter of the recording light is 1.0, but there is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.38 (the substantial spot diameter of the recording light 7a at this time is 0.397 μm) and the maximum coupling efficiency of the recording light at this time is 98.9% substantially approximate to the maximum value and 4.3 times as high as that of the reproducing light (at a maximum 23%) and the rim intensity of the recording light is 0.011 and drastically smaller than an average rim intensity of 0.75 of the reproducing light.

Accordingly, in the optical information recording/reproducing device according to the first embodiment, the average rim intensity of the recording light is drastically smaller than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Although it is described above to prevent the full width at half maximum of the focused spot of the recording light on the focus plane from deteriorating as against the smaller full width at half maximum (direction corresponding to the v-direction) of the focused spot of the reproducing light on the focus plane, it is desirable in the sense of balancing the recording and the reproduction to approximate the focused spot diameter of the recording light to that of the reproducing light (e.g. NA1=0.38, NA2=0.07) without deteriorating the characteristics of the focused spot of the reproducing light very much. In this respect, an average value of the full widths at half maximum corresponding to the v-direction and h-direction may be taken as the value of the full width at half maximum of the focused spot and an average full width at half maximum w1 of the effective focused spot of the recording light on the focus plane may satisfy the following relationship for an average full width at half maximum w2 of the focused spot of the reproducing light on the focus plane.

$$0.8 \cdot w2 \leq w1 \leq 1.2 \cdot w2$$

In the case where the wavelength λ2 of the reproducing light is substantially equal to or shorter than the wavelength λ1 of the recording light, the focused spot diameter of the recording light can be approximated to that of the reproducing light if the average rim intensity of the recording light is set smaller than that of the reproducing light in proportion to a difference λ1−λ2 between the wavelength of the reproducing light and that of the recording light. This is preferable in the sense that the recording and the reproduction can be balanced and, as a result, good optical characteristics such as a good degree of modulation can be obtained.

Further, by arranging the second light source 20b such that the minor axis direction of the elliptical shape of the light intensity distribution coincides with a track direction when the elliptical ratio r of the focused spot shape of the reproducing light on the focus plane is larger than 1, the reproduction characteristics of the recording pit 5 with a small recording mark is improved.

In this embodiment, the convergent light 7a by the objective lens 6 successively three-dimensionally records the recording pits 5 in the recording layers 1a to 1e in such an order of not passing the already recorded recording pits 5. By recording in such an order, there is an effect of reducing the influence of stray lights (noise lights) in the target layer 1b such as scattered lights and unnecessary diffracted lights produced upon passing through the recording pits 5 already recorded in the recording layers 1c to 1e above (closer to the objective lens 6) the target layer 1b (SN ratio improvement). Specifically, by successively recording the recording pits 5 from a position most distant from the objective lens 6 (recording layer 1a in FIG. 1) out of the recording layers 1a to 1e, the above order can be realized. In the construction of FIG. 1, the recording pits may be three-dimensionally recorded in the Z-axis direction in an order of rows of the recording layer 1a, those of the recording layer 1b, those of the recording layer 1c, those of the recording layer 1d and those of the recording layer 1e.

Second Embodiment

Figure 3:
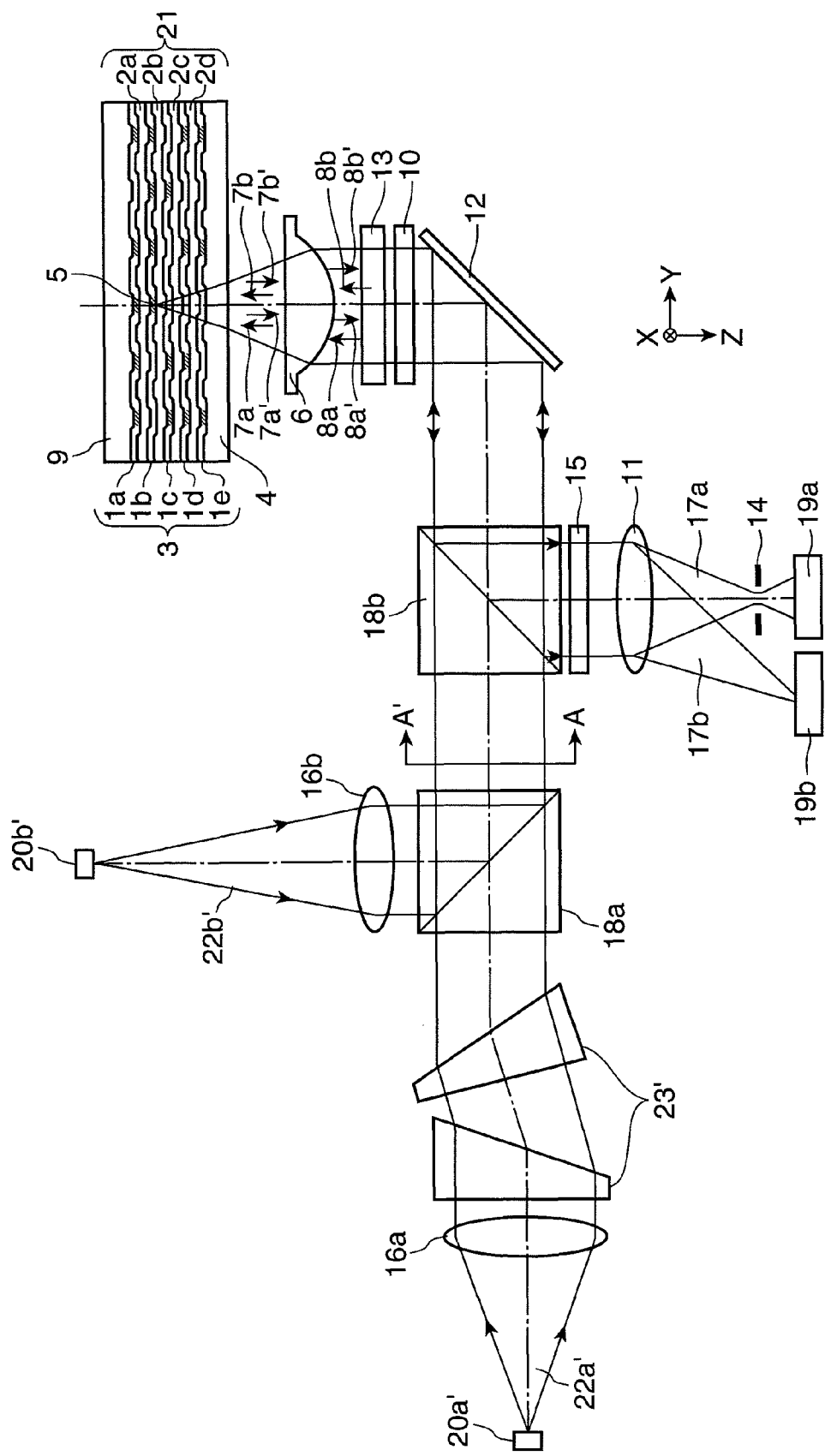
FIG. 3 is a diagram showing the construction of an optical information recording/reproducing device according to a second embodiment of the invention and states of recording/reproducing a signal on/from an information recording medium.
Figure 4A:
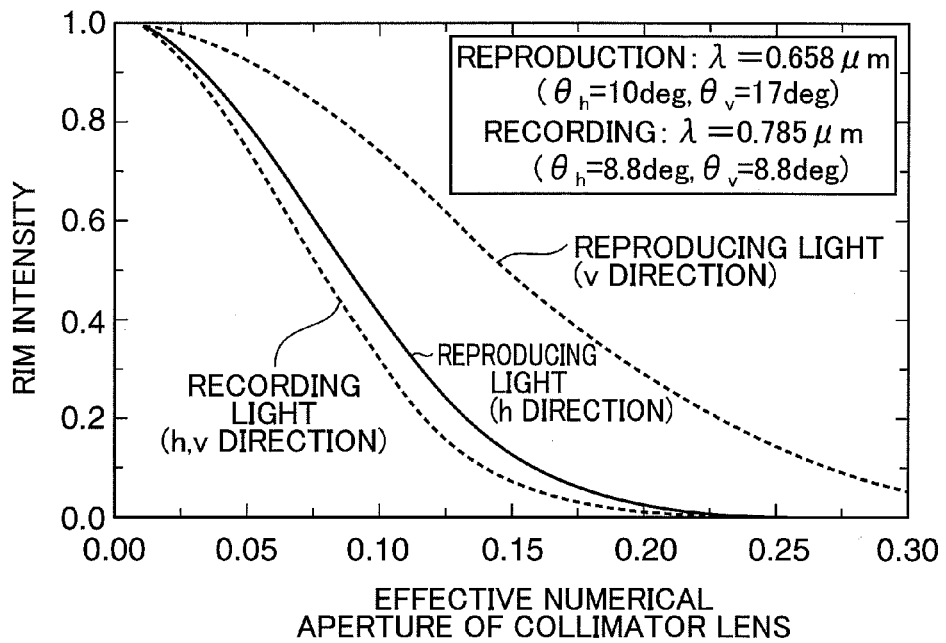
FIG. 4A is a graph showing a relationship between effective numerical apertures of collimator lenses and rim intensities at an objective lens in the optical information recording/reproducing device according to the second embodiment of the invention.
Figure 4B:
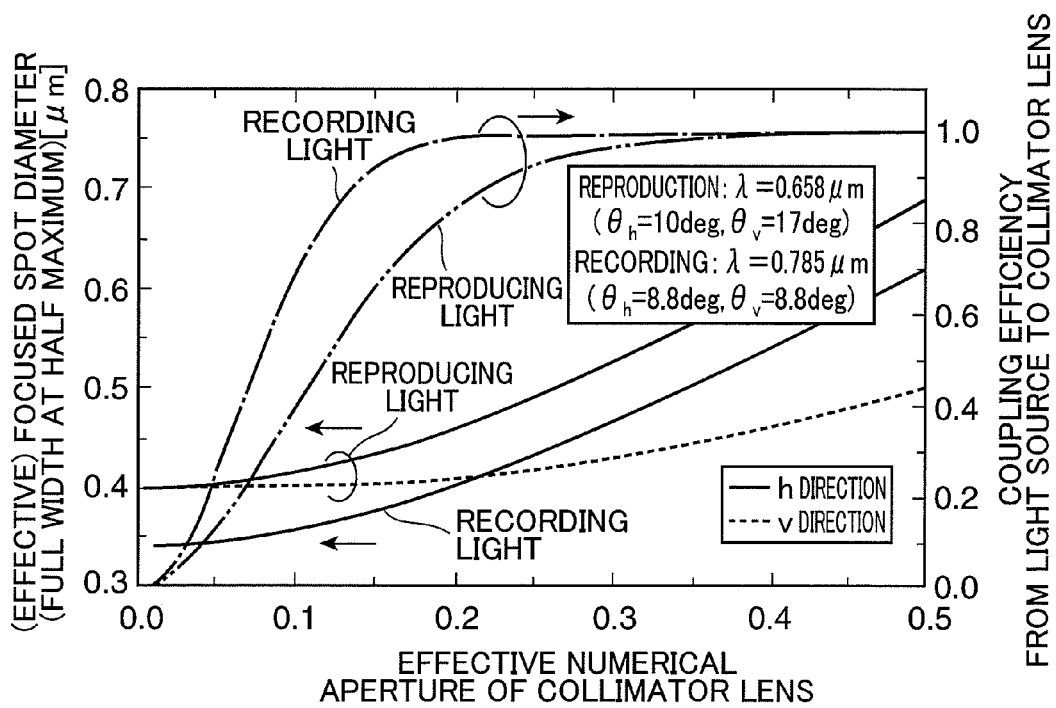
FIG. 4B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the second embodiment of the invention.

Next, an optical information recording/reproducing device according to a second embodiment of the present invention is described in detail with reference to FIGS. 3, 4A and 4B. FIG. 3 is a diagram showing the construction of the optical information recording/reproducing device according to the second embodiment of the present invention and states of recording/reproducing a signal on/from an information recording medium, FIG. 4A is a graph showing a relationship between effective numeral apertures of collimator lenses and rim intensities at an objective lens in the optical information recording/reproducing device according to the second embodiment of the present invention, and FIG. 4B is a graph showing a relationship between the effective numerical apertures of the collimator lenses and (effective) focused spot diameters (full widths at half maximum) on a recording layer (focus plane) of an information recording medium and a relationship between the numerical apertures and coupling efficiencies from light sources to the collimator lenses (when reflection on collimator lens surfaces is ignored) in the optical information recording/reproducing device according to the second embodiment of the present invention. FIG. 4A and FIG. 4B are graphs in the case of two-photon absorption recording as an example of nonlinear recording.

A wavelength λ1 of a first light source 20a' satisfies 0.73 μm≤λ1≤0.83 μm. For example, λ1=0.785 μm and a radiation angle is such that θh=8.8° and θv=17°. A wavelength λ2 of a second light source 20b' satisfies 0.6 μm≤λ2≤0.7 μm. For example, λ2=0.658 μm and a radiation angle is such that θh=10° and θv=17°. These optical characteristics are respectively the same as the light sources 20a, 20b of the optical information recording/reproducing device of the first embodiment.

The optical information recording/reproducing device of the second embodiment of the present invention differs in construction from the optical information recording/reproducing device of the first embodiment in that the first light source 20a' as a recording light source is arranged such that a Z-direction in a coordinate system shown in FIG. 3 coincides with a v-direction of the light source 20a' and a beam diameter in the Z-direction of light 22a' emitted from the first light source 20a' is reduced substantially to a beam diameter in an X-direction by a pair of beam shaping prisms 23'. When the beam diameter is reduced (e.g. in an A-A' plane or the like), the radiation angle of the light source 20a' is equivalently assumed such that θh=θv=8.80. That the beam diameters are substantially equal is assumed to be such that a ratio of the beam diameter in the X-direction to that in the Z-direction lies in a range of 0.7 to 1.3. The second light source 20b' as a reproducing light source is arranged in the same manner as the light source 20b of the optical information recording/reproducing device of the first embodiment.

As shown in FIG. 4A and FIG. 4B, if the effective numerical apertures of first and second collimator lenses 16a, 16b are equal, the equivalent radiation angle is smaller for recording light 8a as compared with the case shown in FIG. 2A and FIG. 2B, wherefore rim intensity decreases and coupling efficiency accordingly increases to increase a deterioration rate of a focused spot diameter. Further, if the effective numerical apertures of the first and second collimator lenses 16a, 16b are equal, the coupling efficiency of the recording light 8a is higher than that of reproducing light 8b.

Accordingly, in this embodiment, if the effective numerical aperture of the first collimator lens 16a and that of the second collimator lens 16b are set equal, for example, NA1=NA2=0.1, the focused spot diameter is 0.414 μm (h-direction), 0.400 μm (v-direction), the coupling efficiency of the reproducing light is 40%, the rim intensity is 0.40 (h-direction), 0.73 (v-direction) with an average rim intensity of 0.57, and an elliptical ratio r of the focused spot diameter is 1.04 for reproducing light 7b. For recording light 7a, the effective focused spot diameter is 0.356 μm (0.87 times as large as the average spot diameter of the reproducing light), the coupling efficiency of the recording light is 69% (1.7 times as high as that of the reproducing light) and the rim intensity is 0.31 (0.54 times as high as the average rim intensity of the reproducing light).

On the other hand, for the reproducing light 7b, the maximum value of the effective numerical aperture NA2 of the second collimator lens 16b is 0.11 on a condition that a deterioration rate is 5% or less (focused spot diameter≦0.419 μm) as compared to a focused spot at a rim intensity of 1. At this time, the focused spot diameter is 0.417 μm (h-direction), 0.401 μm (v-direction), the coupling efficiency of the reproducing light is 46%, the rim intensity is 0.33 (h-direction), 0.69 (v-direction) with an average rim intensity of 0.51, and the elliptical ratio r of the focused spot diameter is 1.04.

The elliptical ratio r of the focused spot diameter of the recording light is 1.0, but there is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.20 (the substantial spot diameter of the recording light 7a at this time is 0.400 μm) and the maximum coupling efficiency of the recording light at this time is 99.1% substantially approximate to the maximum value and 2.2 times as high as that of the reproducing light (at a maximum 46%) and the rim intensity of the recording light is 0.0092 and drastically smaller than an average rim intensity of 0.46 of the reproducing light.

Next, for the reproducing light 7b, the maximum value of the effective numerical aperture NA2 of the second collimator lens 16b is 0.07 on a condition that a more preferable deterioration rate is 2% or less (focused spot diameter≦0.407 μm) as compared to a focused spot at a rim intensity of 1. At this time, the focused spot diameter is 0.406 μm (h-direction), 0.399 μm (v-direction), the coupling efficiency of the reproducing light is 23%, the rim intensity is 0.64 (h-direction), 0.86 (v-direction) with an average rim intensity of 0.75, and the elliptical ratio r of the focused spot diameter is 1.02.

The elliptical ratio r of the focused spot diameter of the recording light is 1.0, but there is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.19 (the substantial spot diameter of the recording light 7a at this time is 0.394 μm) and the maximum coupling efficiency of the recording light at this time is 98.5% substantially approximate to the maximum value and 4.3 times as high as that of the reproducing light (at a maximum 23%) and the rim intensity of the recording light is 0.015 and drastically smaller than an average rim intensity of 0.75 of the reproducing light.

Accordingly, the optical information recording/reproducing device of the second embodiment has a property of decreasing the effective numerical aperture of the first collimator lens 16a approximately to half that of the optical information recording/reproducing device of the first embodiment, but increasing the coupling efficiency in the same manner. The average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a' for recording to the first collimator lens 16a drastically higher than the coupling efficiency as light utilization efficiency from the second light source 20b' for reproducing to the second collimator lens 16b. Therefore, an optical information recording/reproducing device with good optical characteristics can be realized.

Third Embodiment

Figure 5:
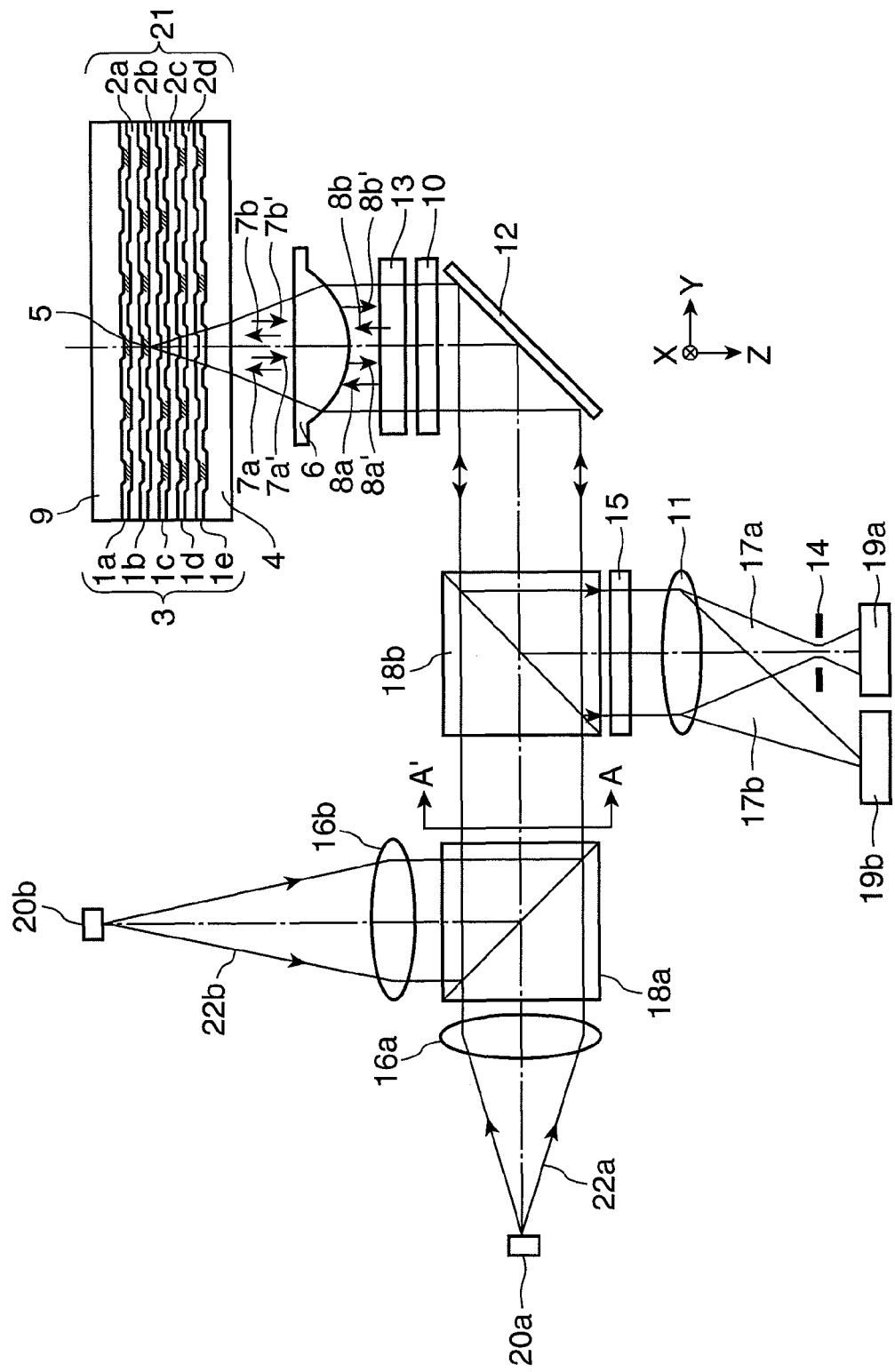
FIG. 5 is a diagram showing the construction of an optical information recording/reproducing device according to a third embodiment of the invention and states of recording/reproducing a signal on/from an information recording medium.
Figure 6A:
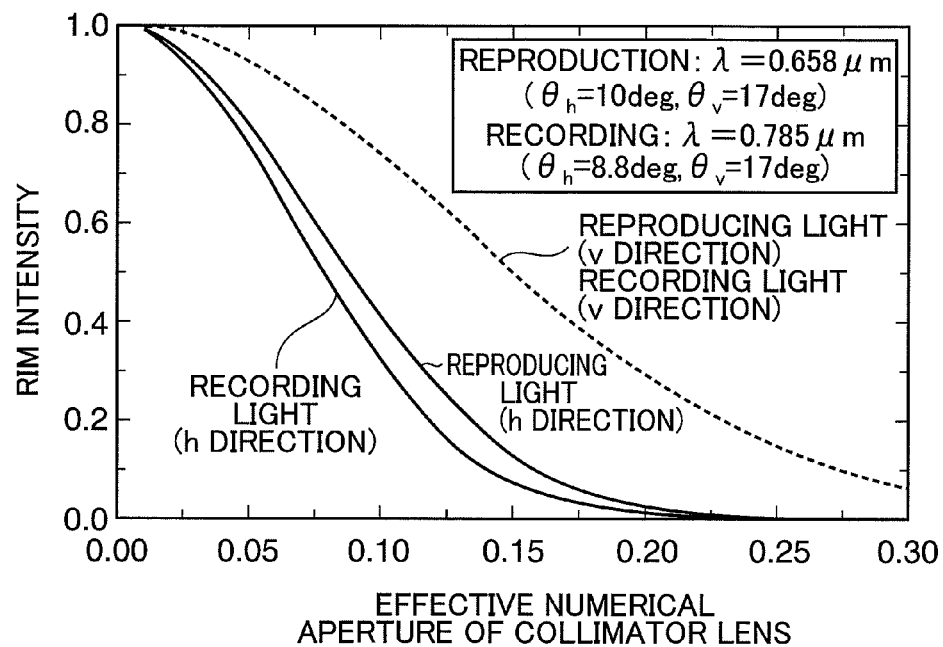
FIG. 6A is a graph showing a relationship between effective numerical apertures of collimator lenses and rim intensities at an objective lens in the optical information recording/reproducing device according to the third embodiment of the invention.
Figure 6B:
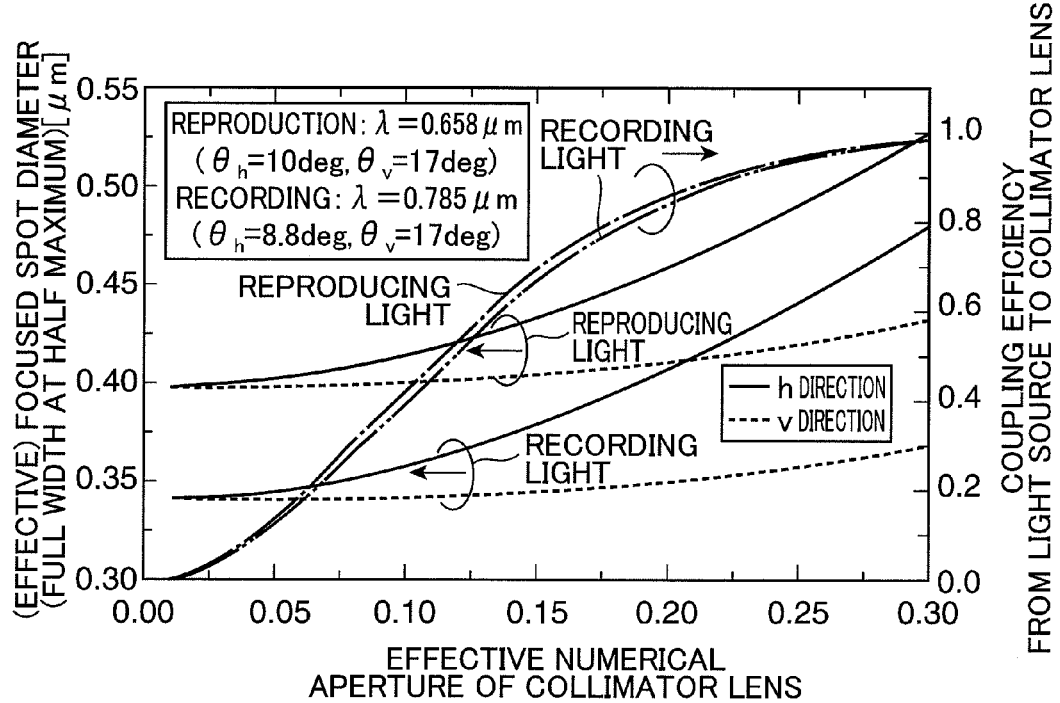
FIG. 6B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the third embodiment of the invention.

Next, an optical information recording/reproducing device according to a third embodiment of the present invention is described with a focus on points of difference from the optical information recording/reproducing device of the first embodiment with reference to FIGS. 5, 6A and 6B. FIG. 5 is a diagram showing the construction of the optical information recording/reproducing device according to the third embodiment of the present invention and states of recording/reproducing a signal on/from an information recording medium, FIG. 6A is a graph showing a relationship between effective numerical apertures of collimator lenses and rim intensities at an objective lens in the optical information recording/reproducing device according to the third embodiment of the present invention, and FIG. 6B is a graph showing a relationship between the effective numerical apertures of the collimator lenses and (effective) focused spot diameters (full widths at half maximum) on a recording layer (focus plane) of an information recording medium and a relationship between the numerical apertures and coupling efficiencies from light sources to the collimator lenses (when reflection on the surfaces of the collimator lenses are ignored) in the optical information recording/reproducing device according to the third embodiment of the present invention. FIG. 6A and FIG. 6B are graphs in the case of two-photon absorption recording as an example of nonlinear recording.

A wavelength λ1 of a first light source 20a satisfies 0.73 µm≦λ1≦0.83 µm. For example, λ1=0.785 µm and a radiation angle is such that θh=8.8° and θv=17°. A wavelength λ2 of a second light source 20b satisfies 0.6 µm≦λ2≦0.7 µm. For example, λ2=0.658 µm and a radiation angle is such that θh=10° and θv=17°. These optical characteristics are the same as the light sources 20a, 20b of the optical information recording/reproducing device of the first embodiment.

The optical information recording/reproducing device of the third embodiment of the present invention differs in construction from the optical information recording/reproducing device of the first embodiment in that no beam shaping prism is arranged between the first light source 20a as a recording light source and a beam splitter 18a. Accordingly, a focused spot on the focus plane of a recording layer 1b has an elliptical light intensity distribution for both recording light 7a and reproducing light 7b. Thus, the first and second light sources 20a, 20b are arranged such that the minor axis directions of the ellipses coincide with a track direction. Such an arrangement has an effect of improving recording/reproducing characteristics of a small recording pit 5 (recording mark). In the case of using the beam shaping prisms, emitted lights from the light sources have needed to be incident on the beam shaping prisms after being converted into perfect parallel lights, wherefore optical adjustments have been cumbersome (astigmatism was likely to occur with substantially parallel lights). Cost reduction is possible and optical adjustments are simpler by omitting the beam shaping prisms.

As shown in FIG. 6A and FIG. 6B, if the effective numerical apertures of first and second collimator lenses 16a, 16b are equal, rim intensity corresponding to an h-direction in which the radiation angle is smaller decreases for both recording light 8a and reproducing light 8b, and the focused spot diameter corresponding to the h-direction largely deteriorates.

For the reproducing light 7b, the maximum value of the effective numerical aperture NA2 of the second collimator lens 16b is 0.11 on a condition that a deterioration rate is 5% or less (focused spot diameter≦0.419 µm) as compared to a focused spot at a rim intensity of 1. At this time, the focused spot diameter is 0.417 µm (h-direction), 0.401 µm (v-direction), the coupling efficiency of the reproducing light is 46%, the rim intensity is 0.33 (h-direction), 0.69 (v-direction) with an average rim intensity of 0.51, and an elliptical ratio r of the focused spot diameter is 1.04.

There is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.18 (the substantial spot diameter of the recording light 7a at this time is 0.395 µm (h-direction), 0.346 µm (v-direction)) and the elliptical ratio r of the focused spot diameter of the recording light is 1.14. At this time, the maximum coupling efficiency of the recording light is 80.3% and 1.7 times as high as that of the reproducing light (at a maximum 46%) and the rim intensity of the recording light is 0.023 (h-direction), 0.37 (v-direction) with an average rim intensity of 0.20, which is drastically smaller than an average rim intensity of 0.51 of the reproducing light.

Next, for the reproducing light 7b, the maximum value of the effective numerical aperture NA2 of the second collimator lens 16b is 0.07 on a condition that a more preferable deterioration rate is 2% or less (focused spot diameter≦0.407 µm) as compared to a focused spot at a rim intensity of 1. At this time, the focused spot diameter is 0.406 µm (h-direction), 0.399 µm (v-direction), the coupling efficiency of the reproducing light is 23%, the rim intensity is 0.64 (h-direction), 0.86 (v-direction) with an average rim intensity of 0.75, and the elliptical ratio r of the focused spot diameter is 1.02.

There is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.18 (the substantial spot diameter of the recording light 7a at this time is 0.395 µm (h-direction), 0.346 µm (v-direction)) and the elliptical ratio r of the focused spot diameter of the recording light is 1.14. At this time, the maximum coupling efficiency of the recording light is 80.3% and 1.7 times as high as that of the reproducing light (at a maximum 46%) and the rim intensity of the recording light is 0.023 (h-direction), 0.37 (v-direction) with an average rim intensity of 0.20, which is drastically smaller than an average rim intensity of 0.75 of the reproducing light.

Accordingly, in the optical information recording/reproducing device according to the third embodiment, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Fourth Embodiment

Figure 7:
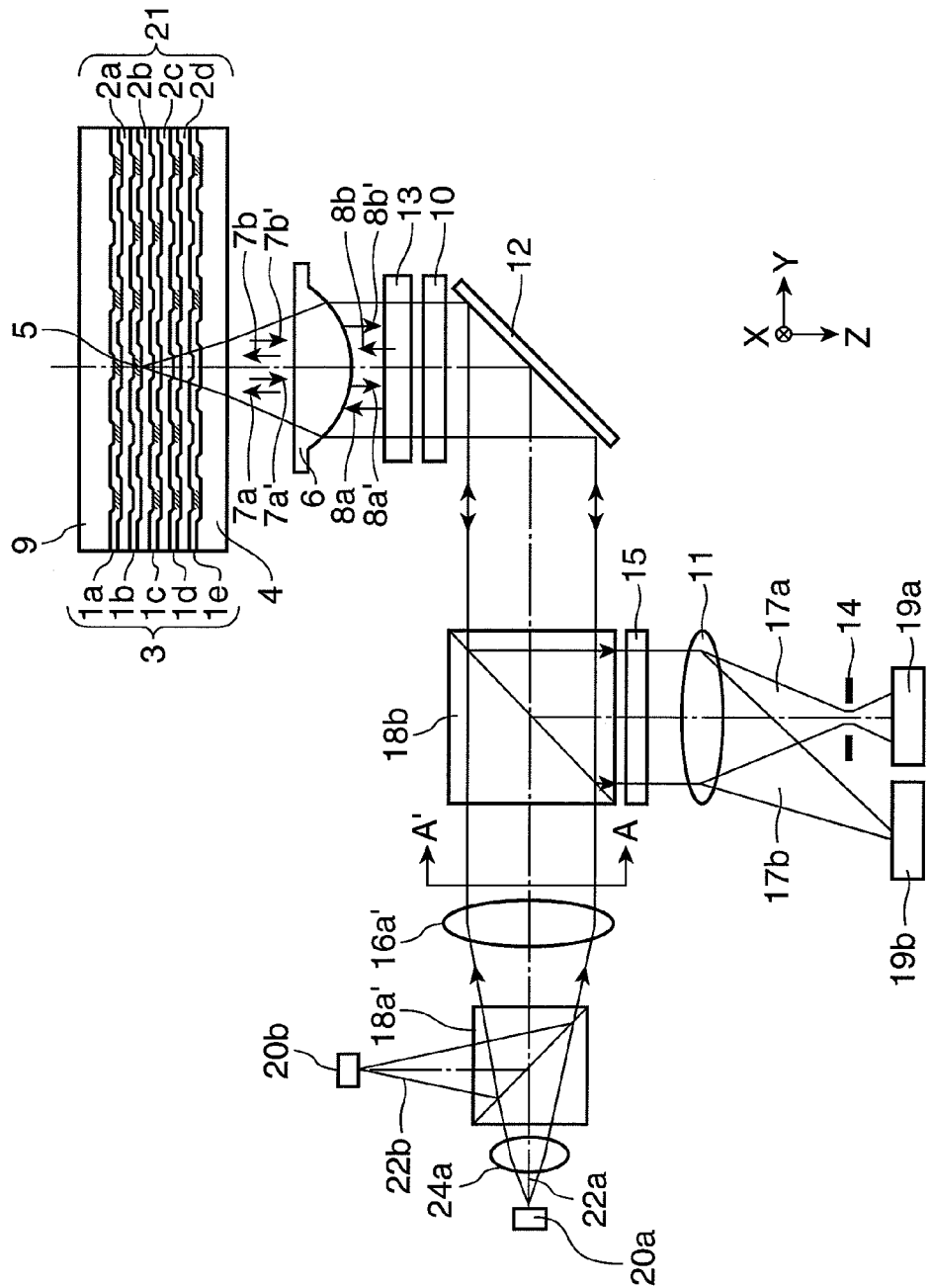
FIG. 7 is a diagram showing the construction of an optical information recording/reproducing device according to a fourth embodiment of the invention and states of recording/reproducing a signal on/from an information recording medium.

Next, an optical information recording/reproducing device according to a fourth embodiment of the present invention is described only about points of difference from the optical information recording/reproducing device of the third embodiment with reference to FIG. 7. FIG. 7 is a diagram showing the construction of the optical information recording/reproducing device according to the fourth embodiment of the present invention and states of recording/reproducing a signal on/from an information recording medium.

The optical information recording/reproducing device of the fourth embodiment of the present invention differs in construction from the optical information recording/reproducing device of the third embodiment in that a convex lens 24a as a numerical aperture conversion element substantially increases a numerical aperture for emitted light 22a from a first light source 20a, the light having passed through the convex lens 24a passes through a beam splitter 18a' and is converted into parallel light by a collimator lens 16a', but emitted light 22b from a second light source 20b has an optical axis bent in a Y-direction by the beam splitter 18a' and is converted into parallel light by the collimator lens 16a'. Accordingly, an effective numerical aperture of the collimator lens 16a' for the recording light 22a can be set larger than that of the collimator lens 16a' for the reproducing light 22b.

Even if a concave lens (not shown) as a numeral aperture conversion element is provided between the second light source 20b and the beam splitter 18a' instead of providing the convex lens 24a between the first light source 20a and the beam splitter 18a' and the emitted light 22b from the second light source 20b is incident on the beam splitter 18a by substantially decreasing the numerical aperture for the emitted light 22b, the effective numerical aperture of the collimator lens 16a' for the recording light 22a can be set larger than that for the reproducing light 22b.

Accordingly, in the optical information recording/reproducing device according to the fourth embodiment, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a' drastically higher than the coupling efficiency as light utilization efficiency from the second light source 20b for reproducing to the second collimator lens 16b'. Therefore, an optical information recording/reproducing device with good optical characteristics can be realized.

Fifth Embodiment

Figure 8:
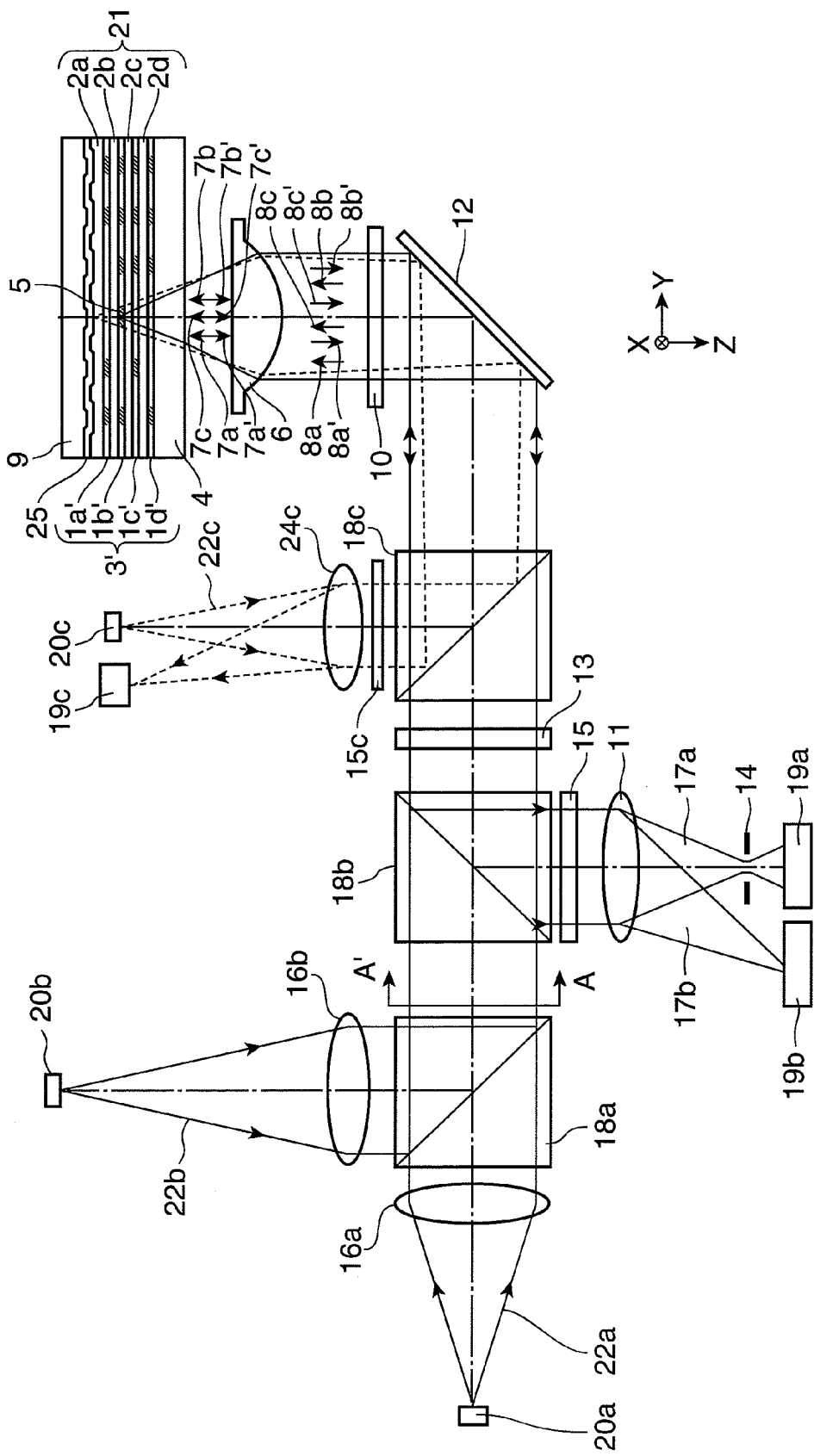
FIG. 8 is a diagram showing the construction of an optical information recording/reproducing device according to a fifth embodiment of the invention and states of recording/reproducing a signal on/from an information recording medium.

Next, an optical information recording/reproducing device according to a fifth embodiment of the present invention is described only about points of difference from the optical information recording/reproducing device of the third embodiment with reference to FIG. 8. FIG. 8 is a diagram showing the construction of the optical information recording/reproducing device according to the fifth embodiment of the present invention and states of recording/reproducing a signal on/from an information recording medium.

The optical information recording/reproducing device of the fifth embodiment of the present invention differs in construction from the optical information recording/reproducing device of the third embodiment in the following points. Specifically, a third light source 20c for tracking servo is provided in addition to a first light source 20a for recording and a second light source 20b for reproducing, and light 22c emitted from the third light source 20c is converted into slightly divergent light by a convex lens 24c as a numerical aperture conversion element, incident on a third beam splitter 18c to have an optical axis bent in a Y-axis direction, and introduced to the same optical path as recording and reproducing lights.

An information recording medium 21 has no track grooves in recording layers 1a' to 1d' and is formed with a track groove 25 for tracking servo on a substrate 9. The respective members are so arranged as to focus servo light 7c invariably on the track groove 25, and reflected light 7c' from the track groove 25 as a tracking error signal has an optical path bent in a −Z-axis direction by the beam splitter 18c and is split by a tracking error signal detection element 15c to be detected by a photodetector 19c for tracking servo. It should be noted that a focus error signal is detected by a photodetector 19b in a manner similar to the above embodiments.

A spherical aberration correction element 13 is arranged in a common optical path for the emitted light 22a from the first light source 20a and the emitted light 22b from the second light source 20b (between a second beam splitter 18b and the third beam splitter 18c in FIG. 8), and an optical path of the emitted light 22c from the third light source 20c does not pass through the spherical aberration correction element 13. By such a construction, a spherical aberration correction can be performed only for recording and reproducing lights. This is because no spherical aberration correction is necessary for tracking servo light since the tracking servo light is invariably focused on the track groove 25.

Further, in the optical information recording/reproducing device according to the fifth embodiment as well, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Sixth Embodiment

Figure 9A:
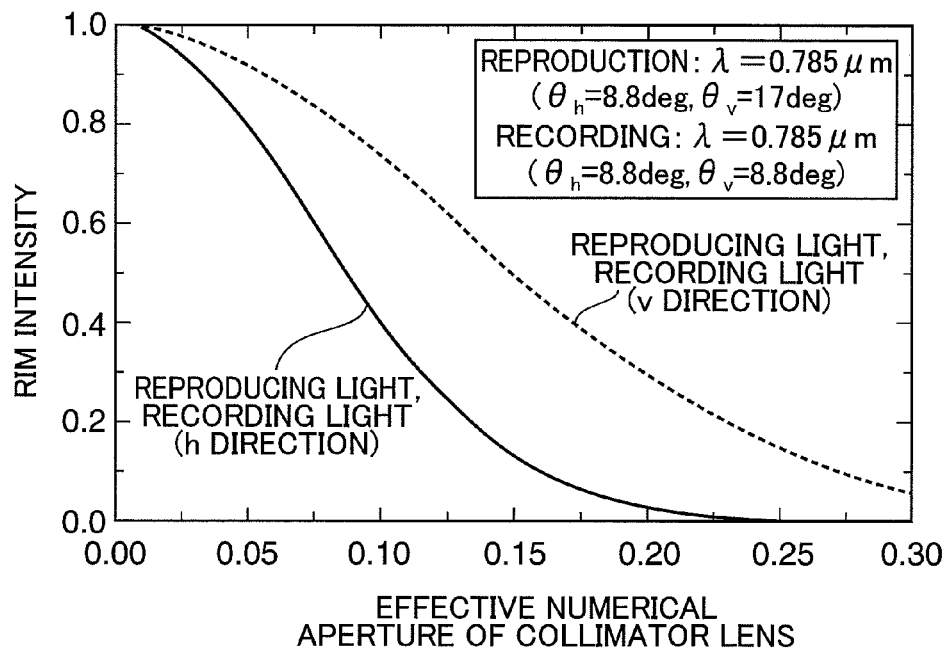
FIG. 9A is a graph showing a relationship between effective numerical apertures of collimator lenses and rim intensities at an objective lens in the optical information recording/reproducing device according to a sixth embodiment of the invention.
Figure 9B:
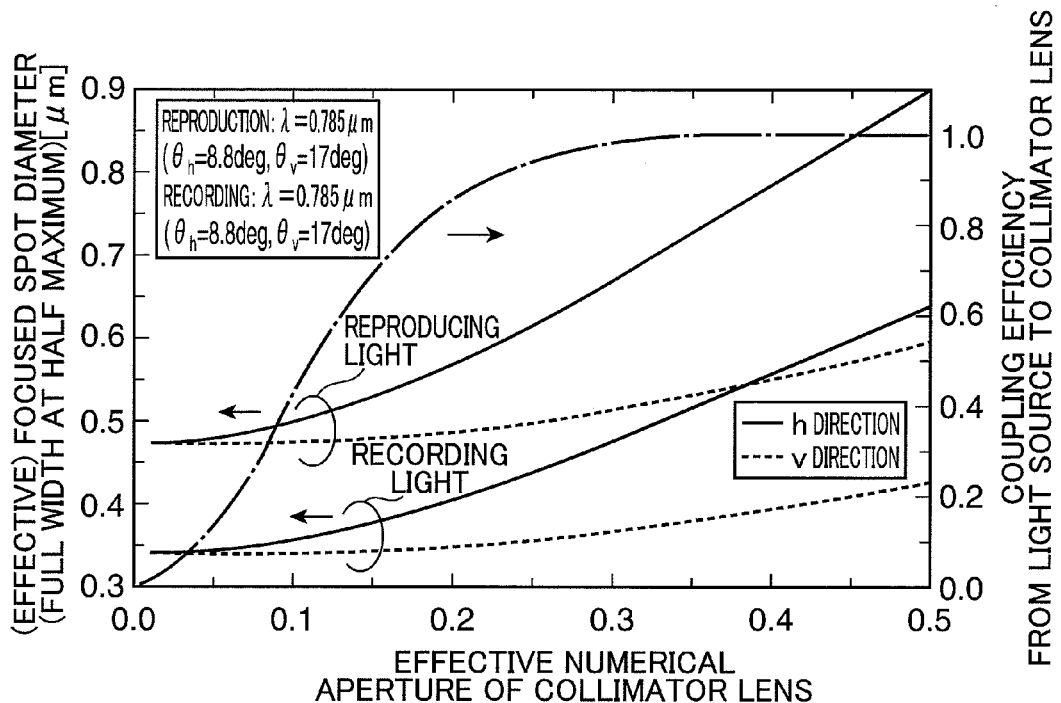
FIG. 9B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the sixth embodiment of the invention.

Next, an optical information recording/reproducing device according to a sixth embodiment of the present invention is described with a focus on points of difference from the optical information recording/reproducing device of the third embodiment with reference to FIG. 9A and FIG. 9B. The construction of the optical information recording/reproducing device according to the sixth embodiment is substantially the same as that of the optical information recording/reproducing device of the third embodiment shown in FIG. 5, but differs in that a second light source 20b has substantially the same wavelength as a first light source 20a. Specifically, a wavelength $\lambda 1$ of the first light source 20a and a wavelength $\lambda 2$ of the second light source 20b lie in a range equal to or longer than 0.73 μm and equal to or shorter than 0.83 μm. For example, $\lambda 1 = \lambda 2 = 0.785$ μm and a radiation angle is such that $\theta h = 8.8°$ and $\theta v = 17°$.

Since a focused spot on a focus plane of a recording layer 1b has an elliptical light intensity distribution for both recording light 7a and reproducing light 7b, the first and second light sources 20a, 20b are arranged such that the minor axis directions of the ellipses coincide with a track direction of the recording layer 1b. Such an arrangement has an effect of improving recording/reproducing characteristics of a small recording pit 5 (recording mark).

The present inventors also found out that the full width at half maximum of the effective focused spot diameter of the recording light could be made smaller than that of the focused spot diameter of the reproducing light substantially at the same rate of $2^{-1/2} = 0.71$ in the respective directions when the rim intensities were equal even if the rim intensities were below 1 and the light intensity distributions of the focused spots on the focus plane were elliptical. Graphs based on this knowledge are FIG. 9A and FIG. 9B below.

FIG. 9A is a graph showing a relationship between effective numerical apertures of collimator lenses and rim intensities at an objective lens in the optical information recording/reproducing device according to the sixth embodiment of the present invention, and FIG. 9B is a graph showing a relationship between the effective numerical apertures of the collimator lenses and (effective) focused spot diameters (full widths at half maximum) on a recording layer (focus plane) of an information recording medium and a relationship between the numerical apertures and coupling efficiencies from light sources to the collimator lenses (when reflection on collimator lens surfaces is ignored) in the optical information recording/reproducing device according to the sixth embodiment of the present invention. FIG. 9A and FIG. 9B are graphs in the case of two-photon absorption recording as an example of nonlinear recording.

Since characteristics of the light sources are substantially equal as shown in FIG. 9A and FIG. 9B, the rim intensities and coupling efficiencies of recording light and reproducing light are respectively equal, but the effective focused spot diameter of the recording light is smaller than the focused spot diameter of the reproducing light due to two-photon absorption recording.

For reproducing light 7b, the maximum value of an effective numerical aperture NA2 of a second collimator lens 16b is 0.10 on a condition that a deterioration rate is 5% or less (focused spot diameter≦0.500 μm) as compared to a focused spot diameter (0.476 μm) at a rim intensity of 1 where the spot diameter can be best narrowed down. At this time, the focused spot diameter is 0.500 μm (h-direction), 0.477 μm (v-direction), the coupling efficiency of the reproducing light is 43%, the rim intensity is 0.31 (h-direction), 0.73 (v-direction) with an average rim intensity of 0.52, and an elliptical ratio r of the focused spot diameter is 1.05.

There is a condition that the effective focused spot diameter of the recording light 7a does not exceed the focused spot diameter of the reproducing light 7b (does not deteriorate) even if an effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.29 (the substantial spot diameter of the recording light 7a at this time is 0.470 μm (h-direction), 0.365 μm (v-direction)) and the elliptical ratio r of the focused spot diameter of the recording light is 1.29. At this time, the maximum coupling efficiency of the recording light is 97.3% approximate to the maximum value and 2.3 times as high as that of the reproducing light (at a maximum 43%) and the rim intensity of the recording light is 0.00005 (h-direction), 0.074 (v-direction) with an average rim intensity of 0.037, which is drastically smaller than an average rim intensity of 0.52 of the reproducing light.

Next, for the reproducing light 7b, the maximum value of the effective numerical aperture NA2 of the second collimator lens 16b is 0.06 on a condition that a more preferable deterioration rate is 2% or less (focused spot diameter≦0.486 μm) as compared to a focused spot at a rim intensity of 1. At this time, the focused spot diameter is 0.484 μm (h-direction), 0.476 μm (v-direction), the coupling efficiency of the reproducing light is 19%, the rim intensity is 0.66 (h-direction), 0.89 (v-direction) with an average rim intensity of 0.78, and the elliptical ratio r of the focused spot diameter is 1.02.

There is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.29 (the substantial spot diameter of the recording light 7a at this time is 0.470 μm (h-direction), 0.365 μm (v-direction)) and the elliptical ratio r of the focused spot diameter of the recording light is 1.29. At this time, the maximum coupling efficiency of the recording light is 93.3% and 4.9 times as high as that of the reproducing light (at a maximum 19%) and the rim intensity of the recording light is 0.00005 (h-direction), 0.074 (v-direction) with an average rim intensity of 0.037, which is drastically smaller than an average rim intensity of 0.78 of the reproducing light.

Accordingly, in the optical information recording/reproducing device according to the sixth embodiment, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Seventh Embodiment

Figure 10A:
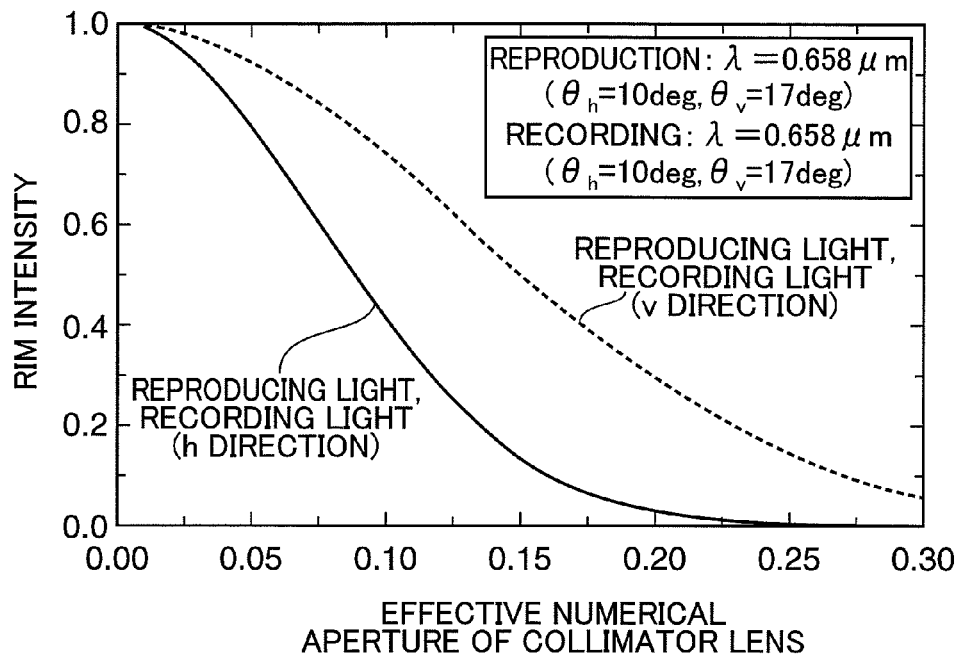
FIG. 10A is a graph showing a relationship between effective numerical apertures of collimator lenses and rim intensities at an objective lens in the optical information recording/reproducing device according to a seventh embodiment of the invention.
Figure 10B:
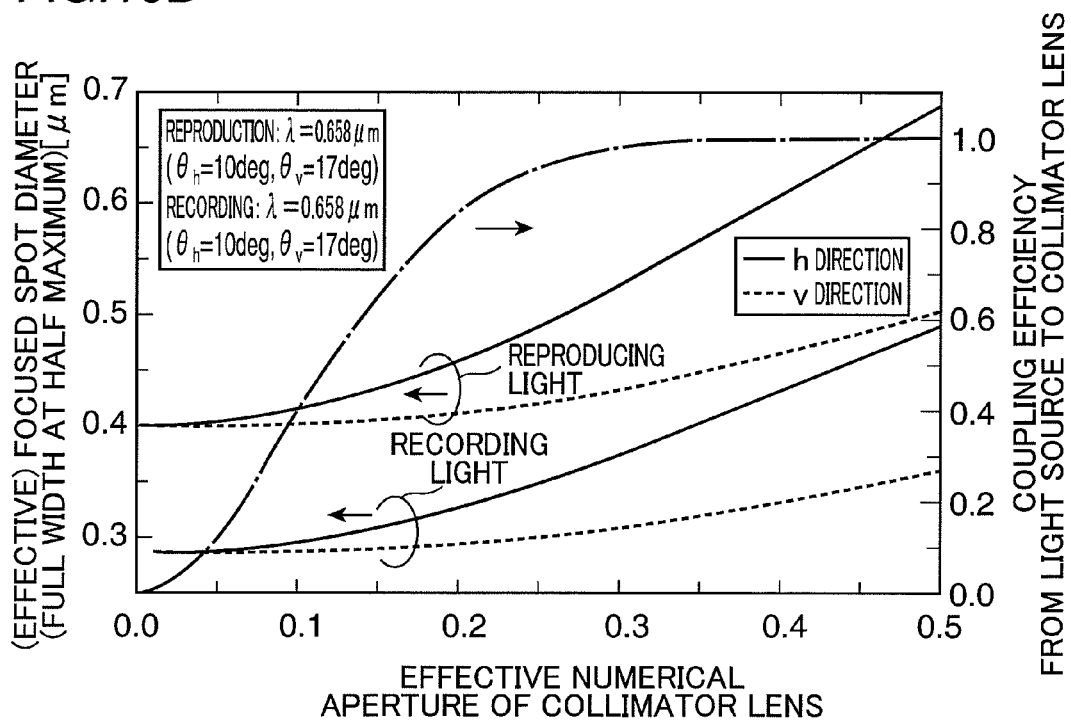
FIG. 10B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the seventh embodiment of the invention.

Next, an optical information recording/reproducing device according to a seventh embodiment of the present invention is described with a focus on points of difference from the optical information recording/reproducing device of the sixth embodiment with reference to FIG. 10A and FIG. 10B. The construction of the optical information recording/reproducing device according to the seventh embodiment is substantially the same as that of the optical information recording/reproducing device of the sixth embodiment, but differs in the following point. A wavelength λ1 of a first light source 20a and a wavelength λ2 of a second light source 20b both lie in a range equal to or longer than 0.6 μm and equal to or shorter than 0.7 μm. For example, λ1=λ2=0.658 μm and a radiation angle is such that θh=10° and θv=17°.

Since a focused spot on a focus plane of a recording layer 1b has an elliptical light intensity distribution for both recording light 7a and reproducing light 7b, the first and second light sources 20a, 20b are arranged such that the minor axis directions of the ellipses coincide with a track direction of the recording layer 1b. Such an arrangement has an effect of improving recording/reproducing characteristics of a small recording pit 5 (recording mark).

FIG. 10A is a graph showing a relationship between effective numerical apertures of collimator lenses and rim intensities at an objective lens in the optical information recording/reproducing device according to the seventh embodiment of the present invention, and FIG. 10B is a graph showing a relationship between the effective numerical apertures of the collimator lenses and (effective) focused spot diameters (full widths at half maximum) on a recording layer (focus plane) of an information recording medium and a relationship between the numerical apertures and coupling efficiencies from light sources to the collimator lenses (when reflection on collimator lens surfaces is ignored) in the optical information recording/reproducing device according to the seventh embodiment of the present invention. FIG. 10A and FIG. 10B are graphs in the case of two-photon absorption recording as an example of nonlinear recording.

Since characteristics of the light sources are substantially equal as shown in FIG. 10A and FIG. 10B, the rim intensities and coupling efficiencies of recording light and reproducing light are respectively equal, but the effective focused spot diameter of the recording light is approximately smaller than the focused spot diameter of the reproducing light due to two-photon absorption recording.

For reproducing light 7b, the maximum value of an effective numerical aperture NA2 of a second collimator lens 16b is 0.11 on a condition that a deterioration rate is 5% or less (focused spot diameter≦0.419 μm) as compared to a focused spot diameter (0.399 μm) at a rim intensity of 1 where the spot diameter can be best narrowed down. At this time, the focused spot diameter is 0.417 μm (h-direction), 0.401 μm (v-direction), the coupling efficiency of the reproducing light is 46%, the rim intensity is 0.33 (h-direction), 0.69 (v-direction) with an average rim intensity of 0.51, and an elliptical ratio r of the focused spot diameter is 1.04.

There is a condition that the effective focused spot diameter of the recording light 7a does not exceed the focused spot diameter of the reproducing light 7b (does not deteriorate) even if an effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.34 (the substantial spot diameter of the recording light 7a at this time is 0.398 μm (h-direction), 0.318 μm (v-direction)) and the elliptical ratio r of the focused spot diameter of the recording light is 1.25. At this time, the maximum coupling efficiency of the recording light is 99.1% approximate to the maximum value and 2.2 times as high as that of the reproducing light (at a maximum 46%) and the rim intensity of the recording light is 0.00003 (h-direction), 0.028 (v-direction) with an average rim intensity of 0.014, which is drastically smaller than an average rim intensity of 0.51 of the reproducing light.

Next, for the reproducing light 7b, the maximum value of the effective numerical aperture NA2 of the second collimator lens 16b is 0.07 on a condition that a more preferable deterioration rate is 2% or less (focused spot diameter≦0.407 μm) as compared to a focused spot at a rim intensity of 1. At this time, the focused spot diameter is 0.406 μm (h-direction), 0.399 μm (v-direction), the coupling efficiency of the reproducing light is 23%, the rim intensity is 0.64 (h-direction), 0.86 (v-direction) with an average rim intensity of 0.75, and the elliptical ratio r of the focused spot diameter is 1.02.

There is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.34 (the substantial spot diameter of the recording light 7a at this time is 0.398 μm (h-direction), 0.318 μm (v-direction)) and the elliptical ratio r of the focused spot diameter of the recording light is 1.25. At this time, the maximum coupling efficiency of the recording light is 99.1% and 4.3 times as high as that of the reproducing light (at a maximum 23%) and the rim intensity of the recording light is 0.00005 (h-direction), 0.074 (v-direction) with an average rim intensity of 0.037, which is drastically smaller than an average rim intensity of 0.78 of the reproducing light.

Accordingly, in the optical information recording/reproducing device according to the seventh embodiment, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Eighth Embodiment

Figure 11A:
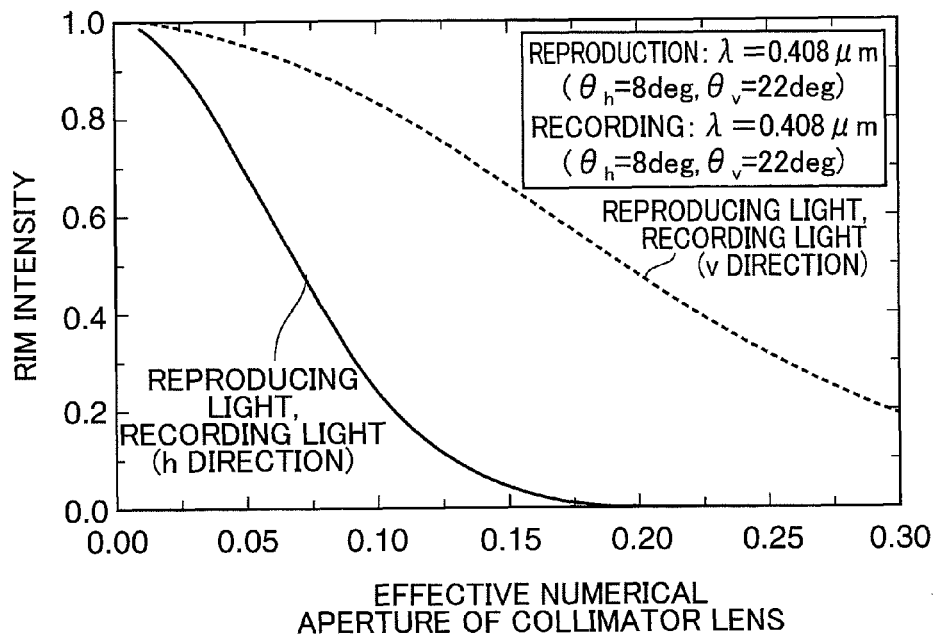
FIG. 11A is a graph showing a relationship between effective numerical apertures of collimator lenses and rim intensities at an objective lens in the optical information recording/reproducing device according to an eighth embodiment of the invention.
Figure 11B:
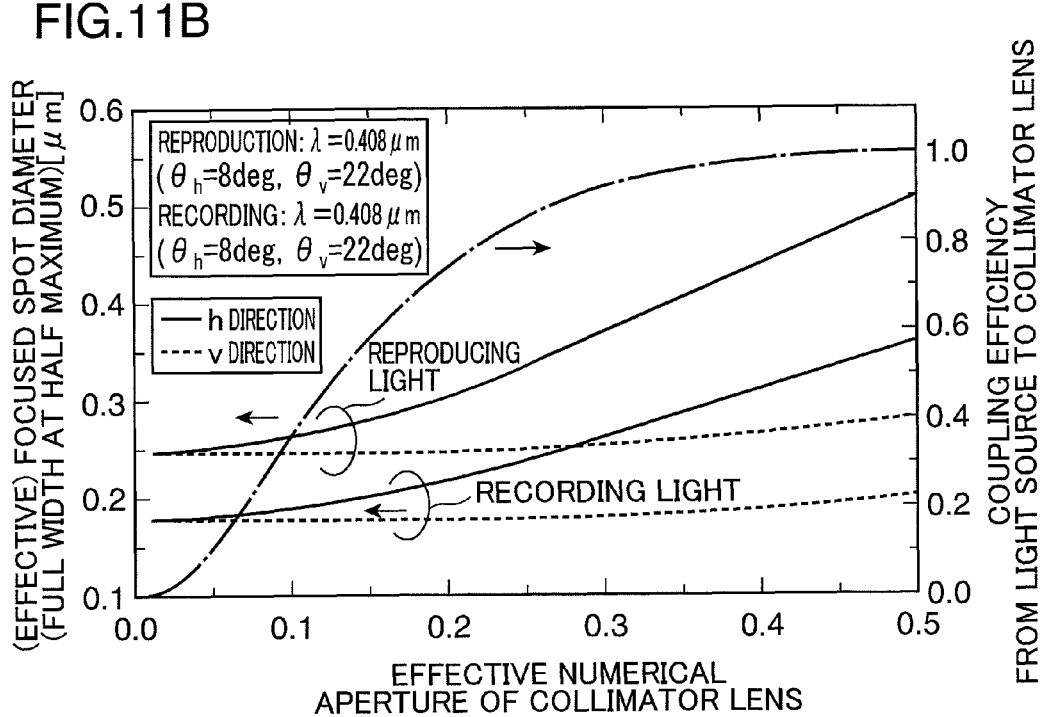
FIG. 11B is a graph showing a relationship between the effective numerical apertures of the collimator lenses and focused spot diameters (full widths at half maximum) on a recording layer (focus plane) of an information recording medium and a relationship between the numerical apertures and coupling efficiencies to the collimator lenses in the optical information recording/reproducing device according to the eighth embodiment of the invention.

Next, an optical information recording/reproducing device according to an eighth embodiment of the present invention is described with a focus on points of difference from the optical information recording/reproducing device of the sixth embodiment with reference to FIG. 11A and FIG. 11B. The construction of the optical information recording/reproducing device according to the eighth embodiment is substantially the same as that of the optical information recording/reproducing device of the sixth embodiment, but differs in the following point. A wavelength λ1 of a first light source 20a and a wavelength λ2 of a second light source 20b both lie in a range equal to or longer than 0.35 μm and equal to or shorter than 0.45 μm. For example, λ1=λ2=0.408 μm and a radiation angle is such that θh=8° and θv=22°.

Since a focused spot on a focus plane of a recording layer 1b has an elliptical light intensity distribution for both recording light 7a and reproducing light 7b, the first and second light sources 20a, 20b are arranged such that the minor axis directions of the ellipses coincide with a track direction of the recording layer 1b. Such an arrangement has an effect of improving recording/reproducing characteristics of a small recording pit 5 (recording mark).

FIG. 11A is a graph showing a relationship between effective numerical apertures of collimator lenses and rim intensities at an objective lens in the optical information recording/reproducing device according to the eighth embodiment of the present invention, and FIG. 11B is a graph showing a relationship between the effective numerical apertures of the collimator lenses and (effective) focused spot diameters (full widths at half maximum) on a recording layer (focus plane) of an information recording medium and a relationship between the numerical apertures and coupling efficiencies from light sources to the collimator lenses (when reflection on collimator lens surfaces is ignored) in the optical information recording/reproducing device according to the eighth embodiment of the present invention. FIG. 11A and FIG. 11B are graphs in the case of two-photon absorption recording as an example of nonlinear recording.

Since characteristics of the light sources are substantially equal as shown in FIG. 11A and FIG. 11B, the rim intensities and coupling efficiencies of recording light and reproducing light are respectively equal, but the effective focused spot diameter of the recording light is approximately smaller than the focused spot diameter of the reproducing light due to two-photon absorption recording.

For reproducing light 7b, the maximum value of an effective numerical aperture NA2 of a second collimator lens 16b is 0.08 on a condition that a deterioration rate is 5% or less (focused spot diameter≦0.259 μm) as compared to a focused spot diameter (0.247 μm) at a rim intensity of 1 where the spot diameter can be best narrowed down. At this time, the focused spot diameter is 0.257 μm (h-direction), 0.246 μm (v-direction), the coupling efficiency of the reproducing light is 40%, the rim intensity is 0.40 (h-direction), 0.89 (v-direction) with an average rim intensity of 0.65, and an elliptical ratio r of the focused spot diameter is 1.04.

There is a condition that the effective focused spot diameter of the recording light 7a does not exceed the focused spot diameter of the reproducing light 7b (does not deteriorate) even if an effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.26 (the substantial spot diameter of the recording light 7a at this time is 0.245 μm (h-direction), 0.179 μm (v-direction)) and the elliptical ratio r of the focused spot diameter of the recording light is 1.37. At this time, the maximum coupling efficiency of the recording light is 87.4% and 2.2 times as high as that of the reproducing light (at a maximum 40%) and the rim intensity of the recording light is 0.00007 (h-direction), 0.29 (v-direction) with an average rim intensity of 0.15, which is drastically smaller than an average rim intensity of 0.65 of the reproducing light.

Next, for the reproducing light 7b, the maximum value of the effective numerical aperture NA2 of the second collimator lens 16b is 0.05 on a condition that a more preferable deterioration rate is 2% or less (focused spot diameter≦0.252 μm) as compared to a focused spot at a rim intensity of 1. At this time, the focused spot diameter is 0.251 μm (h-direction), 0.247 μm (v-direction), the coupling efficiency of the reproducing light is 12%, the rim intensity is 0.70 (h-direction), 0.96 (v-direction) with an average rim intensity of 0.83, and the elliptical ratio r of the focused spot diameter is 1.02.

There is a condition that the effective focused spot diameter of the recording light 7a does not exceed the focused spot diameter of the reproducing light 7b (does not deteriorate) even if the effective numerical aperture NA1 of the first collimator lens 16a is set larger than the effective numerical aperture NA2 of the second collimator lens 16b or even if the coupling efficiency of the recording light is set larger than that of the reproducing light. Its maximum value is reached when NA1=0.26 (the substantial spot diameter of the recording light 7a at this time is 0.245 μm (h-direction), 0.179 μm (v-direction)) and the elliptical ratio r of the focused spot diameter of the recording light is 1.37. At this time, the maximum coupling efficiency of the recording light is 87.4% and 7.3 times as high as that of the reproducing light (at a maximum 12%) and the rim intensity of the recording light is 0.00007 (h-direction), 0.29 (v-direction) with an average rim intensity of 0.15, which is drastically smaller than an average rim intensity of 0.83 of the reproducing light.

Accordingly, in the optical information recording/reproducing device according to the eighth embodiment, the average rim intensity of the recording light is drastically lower than that of the reproducing light, and the effective focused spot diameter of the recording light 7a can be set to or below the focused spot diameter of the reproducing light 7b while setting the coupling efficiency as light utilization efficiency from the first light source 20a for recording to the first collimator lens 16a drastically higher than the coupling efficiency as light utilization efficiency from the second light source 20b for reproducing to the second collimator lens 16b. Therefore, an optical information recording/reproducing device with good optical characteristics can be realized.

Ninth Embodiment

Figure 12:
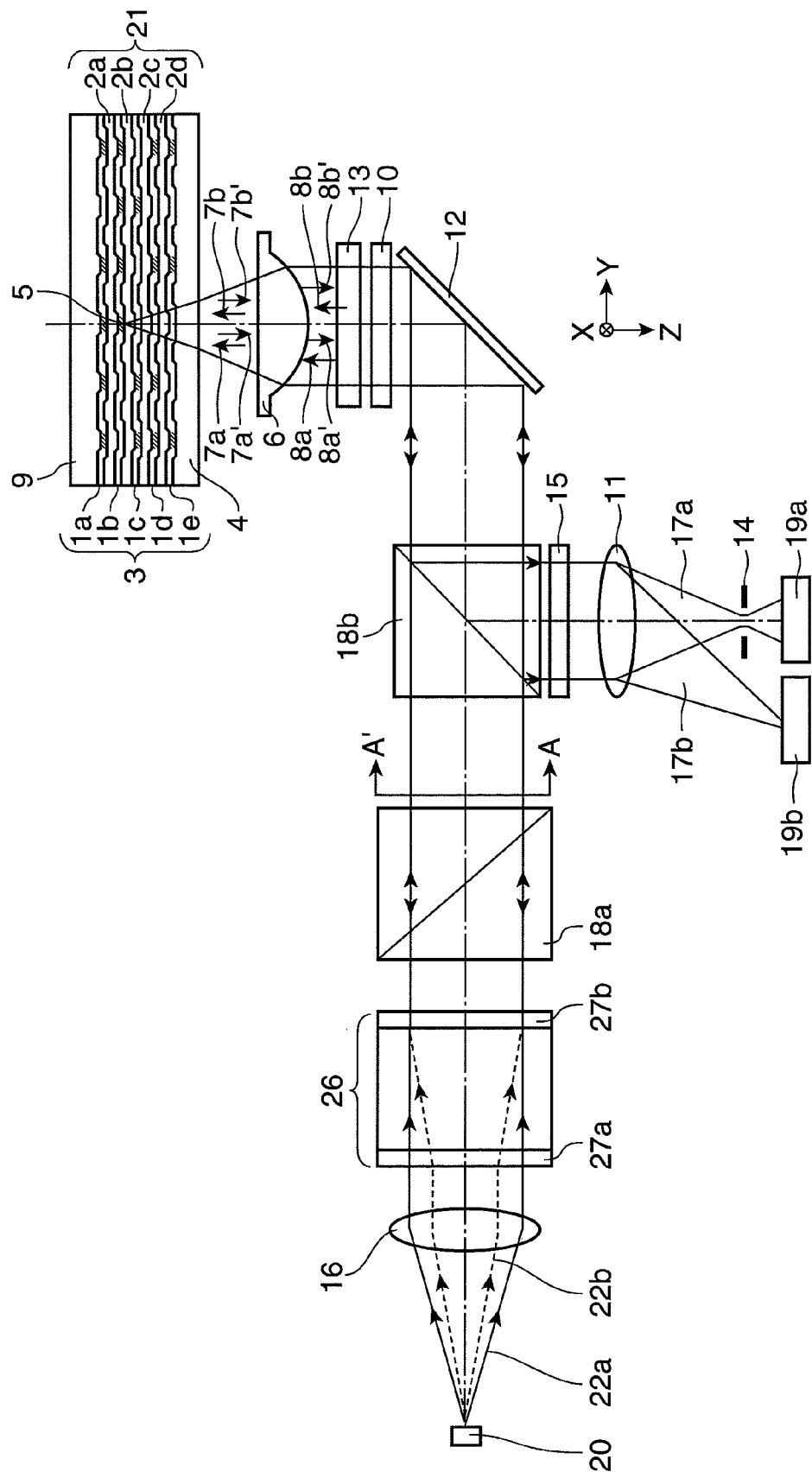
FIG. 12 is a diagram showing the construction of an optical information recording/reproducing device according to a ninth embodiment of the invention and states of recording/reproducing a signal on/from an information recording medium.

Next, an optical information recording/reproducing device according to a ninth embodiment of the present invention is described with a focus on points of difference from the optical information recording/reproducing device of the eighth embodiment with reference to FIG. 12. FIG. 12 is a diagram showing the construction of an optical information recording/reproducing device according to the ninth embodiment of the present invention and states of recording/reproducing a signal on/from an information recording medium.

The optical information recording/reproducing device of the ninth embodiment differs in construction from the optical information recording/reproducing device of the eighth embodiment in that one light source 20 and one collimator lens 16 are provided and a beam diameter changing element 26 is provided in an optical path between the collimator lens 16 and a beam splitter 18a.

The light source 20 is used as both recording light source and reproducing light source, and a wavelength λ thereof lies in a range equal to or longer than 0.35 μm and equal to or shorter than 0.45 μm. For example, λ=0.408 μm and a radiation angle is such that θh=8° and θv=22°. It should be noted that the wavelength of the light source 20 may lie in a range equal to or longer than 0.6 μm and equal to or shorter than 0.7 μm or a range equal to or longer than 0.73 μm and equal to or shorter than 0.83 μm.

The beam diameter changing element 26 is formed such that a pair of focal length changing elements 27a, 27b sandwich a transparent substrate made of glass, transparent resin or the like and are spaced apart by a specified distance. Each of the pair of focal length changing elements 27a, 27b is a liquid crystal element whose refractive index distribution is variable, is formed such that liquid crystal is sandwiched by glass plates with a plurality of transparent segmented electrodes concentrically provided on each glass substrate, and is comprised of four or more areas electrically radially divided. When an electrical potential is applied to each segmented electrode, the refractive index of the liquid crystal changes according to the electrical potential amount and a refractive index change is realized as a phase distribution.

The pair of focus length changing elements 27a, 27b function as a convex lens if realizing a phase distribution in the form of a convex lens and function as a concave lens if realizing a phase distribution in the form of a concave lens. The refractive index distribution or phase amount at that time can be adjusted by an amount of applied voltage and the focal length can also be made variable by this adjustment. The focal length changing elements 27a, 27b are not restricted to the above liquid crystal lenses provided that they can control the focal length.

In this embodiment, the pair of focal length changing elements 27a, 27b are elements having no function (incident beam is emitted without the beam diameter thereof being changed) at the time of recording, and function as focusing lenses, the signs of the focal lengths of which are reversed by voltage application, at the time of reproduction, i.e. the focal length changing element 27a functions as a concave lens and the focal length changing element 27b functions as a convex lens at the time of reproduction. As a result, reproducing light 22b is converted into substantially parallel light by the collimator lens 16, converted into divergent light upon passing through the focal length changing element 27a and reconverted into substantially parallel light by the focal length changing element 27b. The reproducing light 22b passes the beam diameter changing element 26 in this way, with the result that the beam diameter thereof is expanded.

Accordingly, an effective numerical aperture of the collimator lens 16 for the reproducing light 22b can be set smaller than that of the collimator lens 16 for recording light 22a by providing the beam diameter changing element 26 and expanding the beam diameter of the reproducing light by voltage application at the time of reproduction, with the result that an average rim intensity of the recording light at an objective lens 6 is lower than that of the reproducing light.

Accordingly, in the optical information recording/reproducing device according to the ninth embodiment, the average rim intensity of the recording light is lower than that of the reproducing light, and the effective focused spot diameter of recording light 7a can be set to or below the focused spot diameter of reproducing light 7b while setting coupling efficiency as light utilization efficiency from the light source 20 to the collimator lens 16 for the recording light 22a higher than coupling efficiency as light utilization efficiency from the light source 20 to the collimator lens 16 for the reproducing light 22b. Therefore, an optical information recording/reproducing device with good optical characteristics can be realized.

Tenth Embodiment

Figure 13:
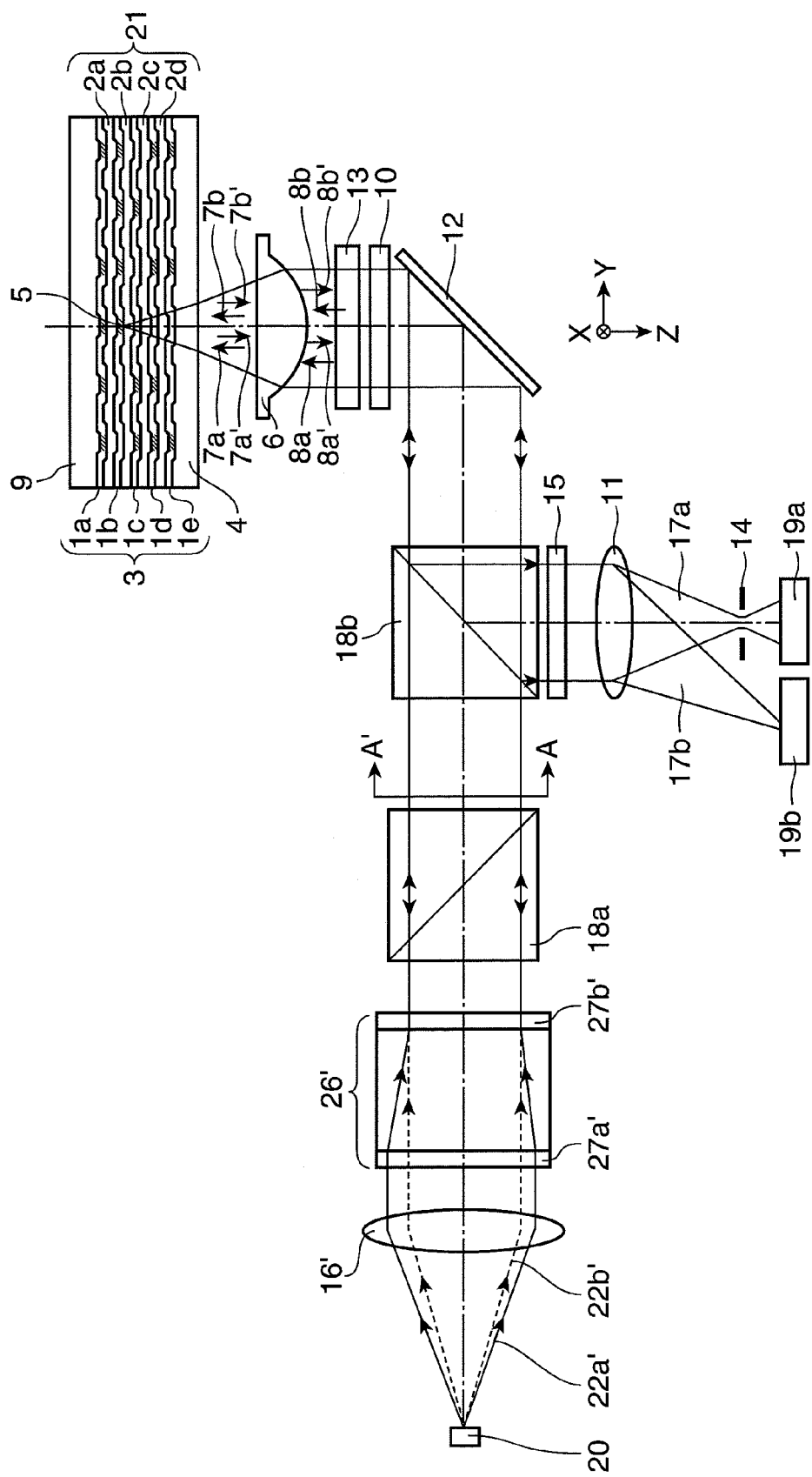
FIG. 13 is a diagram showing the construction of an optical information recording/reproducing device according to a tenth embodiment of the invention and states of recording/reproducing a signal on/from an information recording medium.
Figure 14:
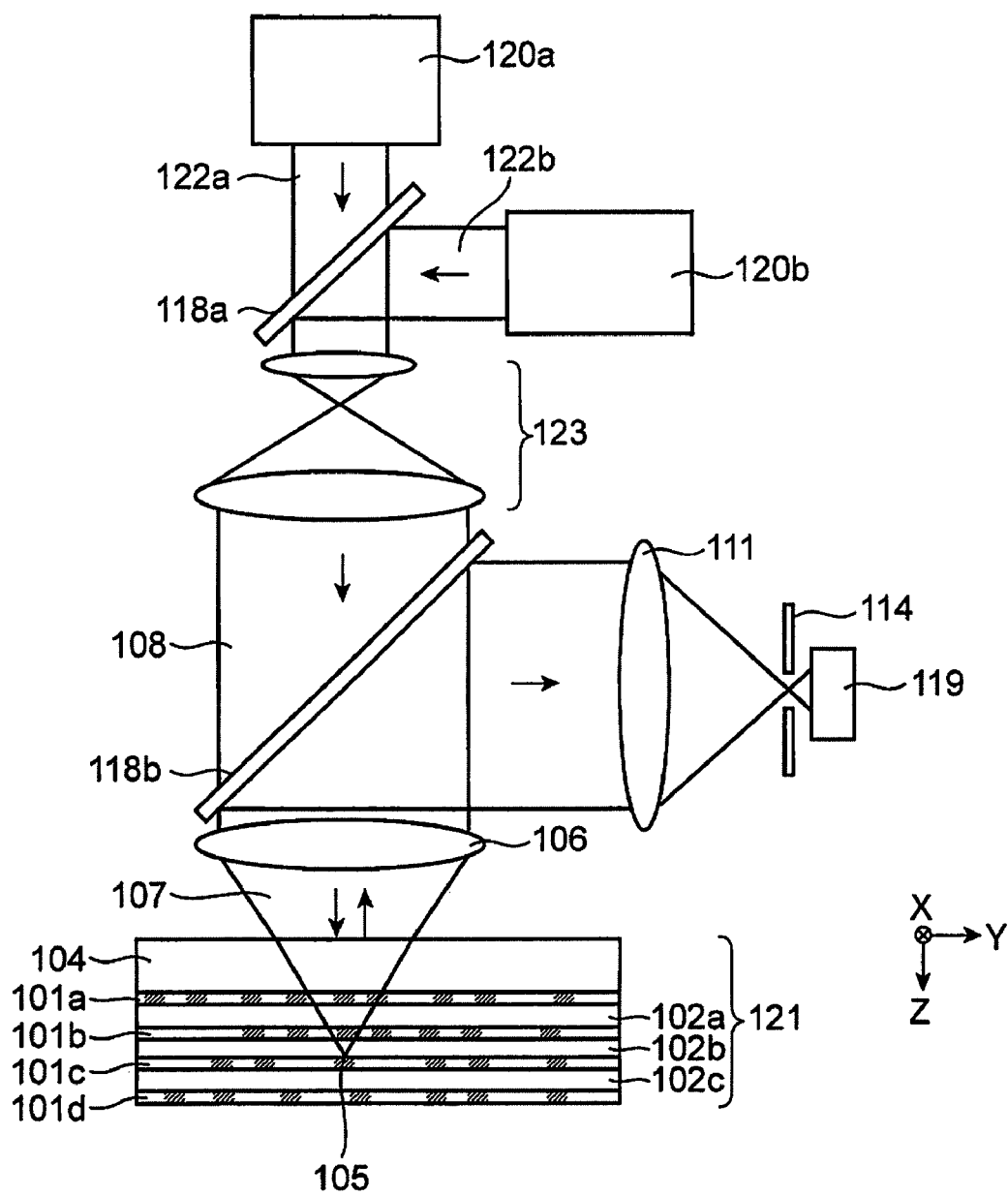
FIG. 14 is a diagram showing the construction of a conventional optical information recording/reproducing device and states of recording/reproducing a signal on/from an information recording medium.

Next, an optical information recording/reproducing device according to a tenth embodiment of the present invention is described with a focus on points of difference from the optical information recording/reproducing device of the ninth embodiment with reference to FIG. 13. FIG. 13 is a diagram showing the construction of an optical information recording/reproducing device according to the tenth embodiment of the present invention and states of recording/reproducing a signal on/from an information recording medium.

The optical information recording/reproducing device of the tenth embodiment differs in construction from the optical information recording/reproducing device of the ninth embodiment in the construction and operation of a beam diameter changing element 26'.

The beam diameter changing element 26' is, similar to the above, formed such that a pair of focal length changing elements 27a', 27b' sandwich a transparent substrate made of glass, transparent resin or the like and are spaced apart by a specified distance.

In this embodiment, the pair of focal length changing elements 27a', 27b' are elements having no function (incident beam is emitted without the beam diameter thereof being changed) at the time of reproduction, and function as focusing lenses, the signs of the focal lengths of which are reversed by voltage application at the time of recording, i.e. the focal length changing element 27a' functions as a convex lens and the focal length changing element 27b' functions as a concave lens at the time of recording. As a result, recording light 22a' is converted into substantially parallel light by a collimator lens 16', converted into convergent light upon passing through the focal length changing element 27a' and reconverted into substantially parallel light by the focal length changing element 27b'. The recording light 22a' passes the beam diameter changing element 26' in this way, with the result that the beam diameter thereof is reduced.

Accordingly, an effective numerical aperture of the collimator lens 16' for the recording light 22a' can be set larger than that of the collimator lens 16' for reproducing light 22b' by providing the beam diameter changing element 26' and reducing the beam diameter of the recording light by voltage application at the time of recording, with the result that an average rim intensity of the recording light at an objective lens 6 is lower than that of the reproducing light.

Accordingly, in the optical information recording/reproducing device according to the tenth embodiment, the average rim intensity of the recording light is lower than that of the reproducing light, and the effective focused spot diameter of recording light 7a can be set to or below the focused spot diameter of reproducing light 7b while setting coupling efficiency as light utilization efficiency from the light source 20 to the collimator lens 16' for the recording light 22a' higher than coupling efficiency as light utilization efficiency from the light source 20 to the collimator lens 16' for the reproducing light 22b'. Therefore, an optical information recording/reproducing device with good optical characteristics can be realized.

The optical information recording/reproducing devices of the first to tenth embodiments are described above, mainly taking two-photon absorption recording as a nonlinear absorption phenomenon that occurs when photon density is high. Similar effects are also obtained in recording by a multiphoton absorption phenomenon such as three-photon absorption, in recording by a plasma absorption phenomenon and in recording by an absorption edge shift phenomenon (recording utilizing a phenomenon in which a recording material reaches a high temperature by the irradiation of recording light, with the result that the band gap of the recording material shifts toward a long wavelength side to increase the light absorption amount of the recording material, and it is effective that the recording material contains $Bi_2O_3$, $ZnO$ and the like in recording at a wavelength of 405 nm). Further, the present invention is not limited to the above respective embodiments, and optical information recording/reproducing devices obtained by arbitrarily combining the constructions of the optical information recording/reproducing devices of the respective embodiments are also embraced by the present invention and can obtain similar effects.

The objective lens, collimator lens and detection lens used in the above embodiments are named so as a matter of convenience and are the same as generally called lenses.

Although the above embodiments are described, taking the optical disc as an example of the information recording medium, the present invention is also applicable to a card-shaped, drum-shaped or tape-shaped product which is designed such that media having different specifications such as thicknesses and recording densities can be reproduced by a similar optical information recording/reproducing device.

The present invention is summarized as follows from the above respective embodiments. Specifically, an optical information recording/reproducing device according to the present invention comprises a light source unit for emitting recording light and reproducing light; an objective lens for focusing the recording and reproducing lights on an information recording medium; and a photodetector for detecting the light reflected from the information recording medium, wherein the information recording medium includes a recording region capable of three-dimensionally recording information by the recording light utilizing a nonlinear absorption phenomenon, and an average rim intensity of the recording light at the objective lens is lower than that of the reproducing light.

In this optical information recording/reproducing device, since the average rim intensity of the recording light at the objective lens is lower than that of the reproducing light, an effective focused spot diameter of the recording light narrowed down by the objective lens becomes a good focused spot diameter by no means inferior to a focused spot diameter of the reproducing light by utilizing the nonlinear absorption phenomenon at the time of recording, i.e. the nonlinear absorption phenomenon that occurs when photon density is high even if its rim intensity is low while the recording light from the light source unit is introduced with high efficiency. Therefore, the light utilization efficiency of the recording light can be improved and an optical information recording/reproducing device with good optical characteristics of focused spots such as an increased modulation depth at the time of reproduction can be realized by well-balancing the spot diameters of the reproducing and recording lights.

It is preferable that a wavelength of the reproducing light is substantially equal to or shorter than that of the recording light; and the smaller a difference between the wavelength of the reproducing light and that of the recording light is, the smaller the average rim intensity of the recording light becomes as compared to that of the reproducing light.

In this case, when the wavelength of the reproducing light is substantially equal to or shorter than that of the recording light, the smaller the difference between the wavelength of the reproducing light and that of the recording light is, the smaller the average rim intensity of the recording light becomes as compared to that of the reproducing light. Thus, the focused spot diameter of the recording light can be approximated to that of the reproducing light, wherefore good recording and reproducing characteristics with balanced recording and reproduction can be realized.

An average full width at half maximum w1 of an effective focused spot on a focus plane of the recording light preferably satisfies $0.8 \cdot w2 \leq w1 \leq 1.2 \cdot w2$ for an average full width at half maximum w2 of a focused spot on a focus plane of the reproducing light.

In this case, since the focused spot diameter of the recording light can be approximated to that of the reproducing light without deteriorating characteristics of the focused spot of the reproducing light very much. Therefore, recording and reproduction can be balanced and an electrical circuit used in the device can be easily realized.

The nonlinear absorption phenomenon preferably includes at least one of a two-photon absorption phenomenon, a multiphoton absorption phenomenon, a plasma absorption phenomenon and an absorption edge shift phenomenon.

In this case, in any of the two-photon absorption phenomenon, multiphoton absorption phenomenon, plasma absorption phenomenon and absorption edge shift phenomenon, a sufficient nonlinear absorption phenomenon occurs when photon density is high. Thus, the effective focused spot diameter of the recording light narrowed down by the objective lens becomes a good focused spot diameter by no means inferior to the focused spot diameter of the reproducing light even if its rim intensity is low. Therefore, there can be realized an optical information recording/reproducing device with high light utilization efficiency of the recording light and good optical characteristics of focused spots.

The light source unit preferably includes a semiconductor laser light source for emitting pulsed light and changes the pulse width from 1 nanosecond to 100 nanoseconds in conformity with the shape of a recording pit to be recorded.

In this case, since the pulse width is changed from 1 nanosecond to 100 nanoseconds in conformity with the shape of the recording pit to be recorded, a recording strategy can be simplified and the recording light can be efficiently generated. Therefore, the power consumption of the device can be reduced.

The wavelength of the recording light and that of the reproducing light both lie in any of a range equal to or longer than 0.35 μm and equal to or shorter than 0.45 μm, a range equal to or longer than 0.6 μm and equal to or shorter than 0.7 μm, and a range equal to or longer than 0.73 μm and equal to or shorter than 0.83 μm.

In this case, since the light source unit can be constructed by the semiconductor laser light source, the miniaturization and lower cost of the device can be accomplished.

It is preferable that the nonlinear absorption phenomenon is a n-photon absorption phenomenon (n is an arbitrary integer equal to or greater than 2); and that a wavelength λ2 of the reproducing light is substantially equal to or shorter than a wavelength λ1 of the recording light and satisfies $\lambda 2 > \lambda 1 \cdot n^{-1/2}$ for the wavelength λ1 of the recording light.

In this case, since $\lambda 2 > \lambda 1 \cdot n^{-1/2}$ is satisfied even if the wavelength λ2 of the reproducing light is substantially equal to or shorter than the wavelength λ1 of the recording light, the effective focused spot diameter of the recording light at which n-photon absorption recording can be performed can be set smaller than the focused spot diameter of the reproducing light by its nonlinear effect.

It is preferable that the wavelength λ1 of the recording light satisfies 0.73 μm≦λ1≦0.83 μm; and that the wavelength λ2 of the reproducing light satisfies 0.6 μm≦λ2≦0.7 μm.

In this case, since the wavelength λ2 of the reproducing light and the wavelength λ1 of the recording light can satisfy $\lambda 2 > \lambda 1 \cdot n^{-1/2}$, the effective focused spot diameter of the recording light at which n-photon absorption recording can be performed can be set smaller than the focused spot diameter of the reproducing light.

The light source unit preferably includes a first light source for emitting the recording light and a second light source for emitting the reproducing light.

In this case, since separate light sources can be used for the recording light and for the reproducing light, the average rim intensities of the recording light and the reproducing light at the objective lens can be easily set to desired values.

It is preferable that a first collimator lens arranged in an optical path between the first light source and the objective lens and a second collimator lens arranged in an optical path between the second light source and the objective lens are further provided; and that an effective numerical aperture of the first collimator lens is larger than that of the second collimator lens.

In this case, since the effective numerical aperture of the first collimator lens is larger than that of the second collimator lens, the rim intensity of the recording light can be decreased and coupling efficiency from the first light source to the first collimator lens can be increased, whereby recording by the nonlinear phenomenon can be easily performed by increasing the intensity of light focused on the information recording medium.

It is preferable to further comprise a beam shaping element arrange in the optical path between the first collimator lens and the objective lens.

In this case, the recording light can be efficiently used since the focused spot diameter and rim intensity of the recording light can be set substantially equal in a horizontal direction and a vertical direction by the beam shaping element.

The beam shaping element preferably includes a beam shaping prism for expanding a beam diameter in a direction parallel to a junction surface of the first light source in such a manner as to be substantially equal to a beam diameter in a direction perpendicular to the junction surface.

In this case, since the beam diameter in the direction parallel with the junction surface of the first light source can be expanded in such a manner as to be substantially equal to the beam diameter in the direction perpendicular to the junction surface by the beam shaping prism, the focused spot diameter and rim intensity of the recording light can be set substantially equal in the horizontal and vertical directions, wherefore the recording light can be efficiently used.

The effective numerical aperture NA1 of the first collimator lens and the effective numerical aperture NA2 of the second collimator lens preferably satisfy NA2≦0.11 and NA2<NA1≦0.39, more preferably satisfy NA2≦0.07 and NA2<NA1≦0.38.

A deterioration rate of the reproducing light as compared to a focused spot at a rim intensity of 1 can be set to or below 5% in the former case, whereas it can be set to or below 2% in the latter case.

The beam shaping element preferably includes a beam shaping prism for reducing a beam diameter in a direction perpendicular to a junction surface of the first light source in such a manner as to be substantially equal to a beam diameter in a direction parallel to the junction surface.

In this case, since the beam diameter in the direction perpendicular to the junction surface of the first light source can be reduced in such a manner as to be substantially equal to the beam diameter in the direction parallel to the junction surface by the beam shaping prism, the focused spot diameter and rim intensity of the recording light can be set substantially equal in the horizontal and vertical directions, wherefore the recording light can be efficiently used.

The effective numerical aperture NA1 of the first collimator lens and the effective numerical aperture NA2 of the second collimator lens preferably satisfy $NA2 \leq 0.11$ and $NA2 < NA1 \leq 0.20$, more preferably satisfy $NA2 \leq 0.07$ and $NA2 < NA1 \leq 0.19$.

A deterioration rate of the reproducing light as compared to a focused spot at a rim intensity of 1 can be set to or below 5% in the former case, whereas it can be set to or below 2% in the latter case.

The wavelength $\lambda 1$ of the recording light preferably satisfies $0.73 \ \mu m \leq \lambda 1 \leq 0.83 \ \mu m$; the wavelength $\lambda 2$ of the reproducing light preferably satisfies $0.6 \ \mu m \leq \lambda 2 \leq 0.7 \ \mu m$; and the effective numerical aperture NA1 of the first collimator lens and the effective numerical aperture NA2 of the second collimator lens preferably satisfy $NA2 \leq 0.11$ and $NA2 < NA1 \leq 0.18$, more preferably satisfy $NA2 \leq 0.07$ and $NA2 < NA1 \leq 0.18$.

When the wavelength $\lambda 1$ of the recording light satisfies $0.73 \ \mu m \leq \lambda 1 \leq 0.83 \ \mu m$ and the wavelength $\lambda 2$ of the reproducing light satisfies $0.6 \ \mu m \leq \lambda 2 \leq 0.7 \ \mu m$, a deterioration rate of the reproducing light as compared to a focused spot at a rim intensity of 1 can be set to or below 5% in the former case, whereas it can be set to or below 2% in the latter case.

The wavelength of the recording light and the wavelength of the reproducing light preferably both lie in a range equal to or longer than $0.73 \ \mu m$ and equal to or shorter than $0.83 \ \mu m$; and the effective numerical aperture NA1 of the first collimator lens and the effective numerical aperture NA2 of the second collimator lens preferably satisfy $NA2 \leq 0.10$ and $NA2 < NA1 \leq 0.29$, more preferably satisfy $NA2 \leq 0.06$ and $NA2 < NA1 \leq 0.29$.

When the wavelength of the recording light and the wavelength of the reproducing light both lie in the range equal to or longer than $0.73 \ \mu m$ and equal to or shorter than $0.83 \ \mu m$, a deterioration rate of the reproducing light as compared to a focused spot at a rim intensity of 1 can be set to or below 5% in the former case, whereas it can be set to or below 2% in the latter case.

The wavelength of the recording light and the wavelength of the reproducing light preferably both lie in a range equal to or longer than $0.6 \ \mu m$ and equal to or shorter than $0.7 \ \mu m$; and the effective numerical aperture NA1 of the first collimator lens and the effective numerical aperture NA2 of the second collimator lens preferably satisfy $NA2 \leq 0.11$ and $NA2 < NA1 \leq 0.34$, more preferably satisfy $NA2 \leq 0.07$ and $NA2 < NA1 \leq 0.34$.

When the wavelength of the recording light and the wavelength of the reproducing light both lie in the range equal to or longer than $0.6 \ \mu m$ and equal to or shorter than $0.7 \ \mu m$, a deterioration rate of the reproducing light as compared to a focused spot at a rim intensity of 1 can be set to or below 5% in the former case, whereas it can be set to or below 2% in the latter case.

The wavelength of the recording light and the wavelength of the reproducing light preferably both lie in a range equal to or longer than $0.35 \ \mu m$ and equal to or shorter than $0.45 \ \mu m$; and the effective numerical aperture NA1 of the first collimator lens and the effective numerical aperture NA2 of the second collimator lens preferably satisfy $NA2 \leq 0.08$ and $NA2 < NA1 \leq 0.26$, more preferably satisfy $NA2 \leq 0.05$ and $NA2 < NA1 \leq 0.26$.

When the wavelength of the recording light and the wavelength of the reproducing light both lie in the range equal to or longer than $0.35 \ \mu m$ and equal to or shorter than $0.45 \ \mu m$, a deterioration rate of the reproducing light as compared to a focused spot at a rim intensity of 1 can be set to or below 5% in the former case, whereas it can be set to or below 2% in the latter case.

It is preferable that light intensity distributions of focused spots on focus planes of the recording light and the reproducing light have elliptical shapes; and that the first and second light sources are arranged such that the major axis directions of the elliptical shapes of the light intensity distributions coincide with each other.

In this case, the cost reduction of the device can be promoted and optical adjustments can be easily performed since the beam shaping element can be omitted.

It is preferable to further comprise a collimator lens arranged in a common path between the first and second light sources and the information recording medium and a numerical aperture conversion element arranged in one of an optical path between the first light source and the collimator lens and an optical path between the second light source and the collimator lens.

In this case, the effective numerical aperture of the collimator lens for the recording light can be set larger than that of the collimator lens for the reproducing light since the numerical aperture of the collimator lens can be substantially changed by the numerical aperture conversion element.

The numerical aperture conversion element is preferably a convex lens in the case of being arranged in the optical path between the first light source and the collimator lens while being a concave lens in the case of being arranged in the optical path between the second light source and the collimator lens.

In this case, the numerical aperture for light emitted from the first light source can be substantially increased by the convex lens or the one for light emitted from the second light source can be substantially decreased by the concave lens, wherefore the effective numerical aperture of the collimator lens for the recording light can be set larger than that of the collimator lens for the reproducing light.

It is preferable that a third light source and a photodetector for tracking servo are further provided; that a substrate of the information recording medium is formed with a track groove for tracking servo; that light emitted from the third light source is focused on the track groove by the objective lens; and that the photodetector for tracking servo detects reflection diffracted lights from the track groove to obtain a tracking error signal.

In this case, since the tracking error signal can be obtained by forming the substrate of the information recording medium with the track groove for tracking servo, it is not necessary to form track grooves in a plurality of recording layers of the information recording medium, which can facilitate a production method for the information recording medium and can promote the lower cost of the information recording medium.

It is preferable to further comprise a spherical aberration correction element arranged not in an optical path for emitted light from the third light source, but in a common optical path for emitted light from the first light source and emitted light from the second light source.

Since the emitted light from the third light source is tracking servo light and invariably focused on the track groove, it is not necessary to perform a spherical aberration correction therefor. By the above arrangement, a spherical aberration correction can be satisfactorily performed only for recording and reproducing lights.

It is preferable that the light source unit includes one light source for emitting light as the recording light or the reproducing light; and that a beam diameter changing element is further provided to make the beam diameter of light emitted from the one light source variable so that the average rim intensity of the recording light is lower than that of the reproducing light.

In this case, since the average rim intensity of the recording light can be set lower than that of the reproducing light by the beam diameter changing element, it is possible, by using one light source, to set the effective focused spot diameter of the recording light to or below the focused spot diameter of the reproducing light while setting the light utilization efficiency of the recording light higher than that of the reproducing light. Therefore, an optical information recording/reproducing device with good optical characteristics can be realized.

It is preferable that light intensity distributions of focused spots on focus planes of the recording light and the reproducing light have elliptical shapes; and that the minor axis directions of the elliptical shapes of the light intensity distributions coincide with a track direction in the recording region.

In this case, the recording/reproducing characteristics of a small recording pit recorded in the information recording medium can be improved.

INDUSTRIAL APPLICABILITY

According to an optical information recording/reproducing device of the present invention, the light utilization efficiency of recording light can be improved, spot diameters of reproducing light and recording light can be well-balanced, and good optical characteristics can be obtained. Therefore, the present invention can be suitably applied to an optical information recording/reproducing device for recording information on an information recording medium including a recording region capable of three-dimensional recording, utilizing a nonlinear absorption phenomenon.

What is claimed is:
1. An optical information recording/reproducing device, comprising:
a light source unit for emitting recording light and reproducing light;
an objective lens for focusing the recording and reproducing lights on an information recording medium; and
a photodetector for detecting the light reflected from the information recording medium, wherein:
the information recording medium includes a recording region capable of three-dimensionally recording information by the recording light utilizing a nonlinear absorption phenomenon, and
an average rim intensity of the recording light at the objective lens is lower than that of the reproducing light;
wherein:
a wavelength of the reproducing light is substantially equal to or shorter than that of the recording light; and
the smaller a difference between the wavelength of the reproducing light and that of the recording light is, the smaller the average rim intensity of the recording light becomes as compared to that of the reproducing light.
2. An optical information recording/reproducing device comprising:
a light source unit for emitting recording light and reproducing light;
an objective lens for focusing the recording and reproducing lights on an information recording medium; and
a photodetector for detecting the light reflected from the information recording medium,
wherein:
the information recording medium includes a recording region capable of three-dimensionally recording information by the recording light utilizing a nonlinear absorption phenomenon,
an average rim intensity of the recording light at the objective lens is lower than that of the reproducing light, and
an average full width at half maximum w1 of an effective focused spot on a focus plane of the recording light satisfies $0.8 \cdot w2 \leq w1 \leq 1.2 \cdot w2$ for an average full width at half maximum w2 of a focused spot on a focus plane of the reproducing light.
3. An optical information recording/reproducing device according to claim 1, wherein the nonlinear absorption phenomenon includes at least one of a two-photon absorption phenomenon, a multiphoton absorption phenomenon, a plasma absorption phenomenon and an absorption edge shift phenomenon.
4. An optical information recording/reproducing device according to claim 1, wherein the light source unit includes a semiconductor laser light source for emitting pulsed light and changes the pulse width from 1 nanosecond to 100 nanoseconds in conformity with the shape of a recording pit to be recorded.
5. An optical information recording/reproducing device according to claim 1, wherein the wavelength of the recording light and that of the reproducing light both lie in any of a range equal to or longer than 0.35 μm and equal to or shorter than 0.45 μm, a range equal to or longer than 0.6 μm and equal to or shorter than 0.7 μm, and a range equal to or longer than 0.73 μm and equal to or shorter than 0.83 μm.
6. An optical information recording/reproducing device according to claim 1, wherein:
the nonlinear absorption phenomenon is a n-photon absorption phenomenon (n is an arbitrary integer equal to or greater than 2); and
a wavelength $\lambda 2$ of the reproducing light is substantially equal to or shorter than a wavelength $\lambda 1$ of the recording light and satisfies $\lambda 2 > \lambda 1 \cdot n^{-1/2}$ for the wavelength $\lambda 1$ of the recording light.
7. An optical information recording/reproducing device according to claim 6, wherein:
the wavelength $\lambda 1$ of the recording light satisfies $0.73$ μm $\leq \lambda 1 \leq 0.83$ μm; and
the wavelength $\lambda 2$ of the reproducing light satisfies $0.6$ μm $\leq \lambda 2 \leq 0.7$ μm.
8. An optical information recording/reproducing device according to claim 1, wherein the light source unit includes:
a first light source for emitting the recording light, and
a second light source for emitting the reproducing light.
9. An optical information recording/reproducing device comprising:
a light source unit for emitting recording light and reproducing light, which includes a first light source for emitting the recording light and a second light source for emitting the reproducing light,
an objective lens for focusing the recording and reproducing lights on an information recording medium; and
a photodetector for detecting the light reflected from the information recording medium,
a first collimator lens arranged in an optical path between the first light source and the objective lens, and a second collimator lens arranged in an optical path between the second light source and the objective lens, wherein:

the information recording medium includes a recording region capable of three-dimensionally recording information by the recording light utilizing a nonlinear absorption phenomenon;

an average rim intensity of the recording light at the objective lens is lower than that of the reproducing light; and an effective numerical aperture of the first collimator lens is larger than that of the second collimator lens.

10. An optical information recording/reproducing device according to claim 9, further comprising a beam shaping element arrange in the optical path between the first collimator lens and the objective lens.

11. An optical information recording/reproducing device according to claim 9, wherein the beam shaping element includes a beam shaping prism for expanding a beam diameter in a direction parallel to a junction surface of the first light source in such a manner as to be substantially equal to a beam diameter in a direction perpendicular to the junction surface.

12. An optical information recording/reproducing device according to claim 11, wherein the effective numerical aperture NA1 of the first collimator lens and the effective numerical aperture NA2 of the second collimator lens satisfy NA2≦0.11 and NA2<NA1≦0.39.

13. An optical information recording/reproducing device according to claim 10, wherein the beam shaping element includes a beam shaping prism for reducing a beam diameter in a direction perpendicular to a junction surface of the first light source in such a manner as to be substantially equal to a beam diameter in a direction parallel to the junction surface.

14. An optical information recording/reproducing device according to claim 13, wherein the effective numerical aperture NA1 of the first collimator lens and the effective numerical aperture NA2 of the second collimator lens satisfy NA2≦0.11 and NA2<NA1≦0.20.

15. An optical information recording/reproducing device according to claim 9, wherein:

the wavelength λ1 of the recording light satisfies 0.73 μm≦λ1≦0.83 μm;

the wavelength λ2 of the reproducing light satisfies 0.6 μm≦λ2≦0.7 μm; and the effective numerical aperture NA1 of the first collimator lens and the effective numerical aperture NA2 of the second collimator lens satisfy NA2≦0.11 and NA2≦NA1≦0.18.

16. An optical information recording/reproducing device according to claim 9, wherein:

the wavelength of the recording light and the wavelength of the reproducing light both lie in a range equal to or longer than 0.73 μm and equal to or shorter than 0.83 μm; and the effective numerical aperture NA1 of the first collimator lens and the effective numerical aperture NA2 of the second collimator lens satisfy NA2≦0.10 and NA2≦NA1≦0.29.

17. An optical information recording/reproducing device according to claim 9, wherein:

the wavelength of the recording light and the wavelength of the reproducing light both lie in a range equal to or longer than 0.6 μm and equal to or shorter than 0.7 μm; and the effective numerical aperture NA1 of the first collimator lens and the effective numerical aperture NA2 of the second collimator lens satisfy NA2≦0.11 and NA2<NA1≦0.34.

18. An optical information recording/reproducing device according to claim 9, wherein:

the wavelength of the recording light and the wavelength of the reproducing light both lie in a range equal to or longer than 0.35 μm and equal to or shorter than 0.45 μm; and the effective numerical aperture NA1 of the first collimator lens and the effective numerical aperture NA2 of the second collimator lens satisfy NA2≦0.08 and NA2<NA1≦0.26.

19. An optical information recording/reproducing device according to claim 8, wherein:

light intensity distributions of focused spots on focus planes of the recording light and the reproducing light have elliptical shapes; and the first and second light sources are arranged such that the major axis directions of the elliptical shapes of the light intensity distributions coincide with each other.

20. An optical information recording/reproducing device according to claim 8, further comprising:

a collimator lens arranged in a common path between the first and second light sources and the information recording medium; and a numerical aperture conversion element arranged in one of an optical path between the first light source and the collimator lens and an optical path between the second light source and the collimator lens.

21. An optical information recording/reproducing device according to claim 20, wherein the numerical aperture conversion element is a convex lens in the case of being arranged in the optical path between the first light source and the collimator lens while being a concave lens in the case of being arranged in the optical path between the second light source and the collimator lens.

22. An optical information recording/reproducing device according to claim 8, further comprising a third light source and a photodetector for tracking servo, wherein:

a substrate of the information recording medium is formed with a track groove for tracking servo; and light emitted from the third light source is focused on the track groove by the objective lens and the photodetector for tracking servo detects reflection diffracted lights from the track groove to obtain a tracking error signal.

23. An optical information recording/reproducing device according to claim 22, further comprising a spherical aberration correction element arranged not in an optical path for emitted light from the third light source, but in a common optical path for emitted light from the first light source and emitted light from the second light source.

24. An optical information recording/reproducing device according to claim 1, wherein:

the light source unit includes one light source for emitting light as the recording light or the reproducing light; and a beam diameter changing element is further provided to make the beam diameter of light emitted from the one light source variable so that the average rim intensity of the recording light is lower than that of the reproducing light.

25. An optical information recording/reproducing device according to claim 8, wherein:

light intensity distributions of focused spots on focus planes of the recording light and the reproducing light have elliptical shapes; and the minor axis directions of the elliptical shapes of the light intensity distributions coincide with a track direction in the recording region.

* * * * *